(12) United States Patent
Takahashi et al.

(10) Patent No.: US 9,780,374 B2
(45) Date of Patent: Oct. 3, 2017

(54) BINDER FOR ELECTRODES OF LITHIUM SECONDARY BATTERIES, AND LITHIUM SECONDARY BATTERY WHICH USES ELECTRODE PRODUCED USING BINDER FOR ELECTRODES OF LITHIUM SECONDARY BATTERIES

(71) Applicant: Dai-Ichi Kogyo Seiyaku Co., Ltd., Kyoto-shi, Kyoto (JP)

(72) Inventors: Katsuo Takahashi, Kyoto (JP); Shuichi Ito, Kyoto (JP); Takeshi Miyamura, Kyoto (JP)

(73) Assignee: DAI-ICHI KOGYO SEIYAKU CO., LTD., Kyoto (JP)

( * ) Notice: Subject to any disclaimer, the term of this patent is extended or adjusted under 35 U.S.C. 154(b) by 355 days.

(21) Appl. No.: 14/375,283

(22) PCT Filed: Jan. 28, 2013

(86) PCT No.: PCT/JP2013/000427
§ 371 (c)(1),
(2) Date: Jul. 29, 2014

(87) PCT Pub. No.: WO2013/114849
PCT Pub. Date: Aug. 8, 2013

(65) Prior Publication Data
US 2015/0017533 A1  Jan. 15, 2015

(30) Foreign Application Priority Data

Feb. 2, 2012 (JP) ................................ 2012-021071
Feb. 2, 2012 (JP) ................................ 2012-021072
Mar. 27, 2012 (JP) ................................ 2012-072439
Mar. 30, 2012 (JP) ................................ 2012-078634
Apr. 20, 2012 (JP) ................................ 2012-096306

(51) Int. Cl.
| | |
|---|---|
| H01M 4/62 | (2006.01) |
| H01M 10/052 | (2010.01) |
| C08G 18/66 | (2006.01) |
| C08G 18/75 | (2006.01) |
| C08G 18/08 | (2006.01) |
| C08G 18/32 | (2006.01) |
| C08G 18/34 | (2006.01) |
| C08G 18/42 | (2006.01) |
| C08G 18/44 | (2006.01) |
| C08G 18/48 | (2006.01) |
| C08G 18/73 | (2006.01) |
| C08F 283/00 | (2006.01) |

(52) U.S. Cl.
CPC ......... *H01M 4/622* (2013.01); *C08F 283/006* (2013.01); *C08G 18/0814* (2013.01); *C08G 18/0823* (2013.01); *C08G 18/3215* (2013.01); *C08G 18/348* (2013.01); *C08G 18/4213* (2013.01); *C08G 18/44* (2013.01); *C08G 18/4854* (2013.01); *C08G 18/6659* (2013.01); *C08G 18/6692* (2013.01); *C08G 18/73* (2013.01); *C08G 18/755* (2013.01); *C08G 18/758* (2013.01); *H01M 4/621* (2013.01); *H01M 10/052* (2013.01); *H01M 2220/30* (2013.01); *Y02T 10/7011* (2013.01)

(58) Field of Classification Search
CPC ...................................................... H01M 4/62
See application file for complete search history.

(56) References Cited

U.S. PATENT DOCUMENTS

| | | | |
|---|---|---|---|
| 8,722,230 B2 | 5/2014 | Hwang et al. | |
| 2006/0235144 A1* | 10/2006 | Hwang | C08G 18/0823 524/591 |
| 2010/0248026 A1* | 9/2010 | Hinoki | H01M 4/13 429/209 |
| 2012/0189915 A1 | 7/2012 | Cho et al. | |

FOREIGN PATENT DOCUMENTS

| | | |
|---|---|---|
| JP | 5-21068 | 1/1993 |
| JP | 10-021927 | 1/1998 |
| JP | 11-001676 | 1/1999 |
| JP | 11-7948 | 1/1999 |
| JP | 2001-210318 | 8/2001 |
| JP | 2005-044681 | 2/2005 |
| JP | 2006-294615 | 10/2006 |
| JP | 2007-200897 | 8/2007 |
| JP | 2012-151112 | 8/2012 |
| JP | 2012-204009 | 10/2012 |
| JP | 2012-204010 | 10/2012 |

* cited by examiner

*Primary Examiner* — Jacob Marks
(74) *Attorney, Agent, or Firm* — Norris McLaughlin & Marcus, P.A.

(57) ABSTRACT

To provide a binder that has high adhesiveness to a collector, does not cause release in press molding, has high flexibility, and is excellent in binding capability and resistance to an electrolytic solution, and to provide a lithium secondary battery that is excellent in charge and discharge characteristics using an electrode produced with the binder. The binder for an electrode used contains a hydrophilic group-containing polyurethane as a water dispersion that contains (A) a polyisocyanate, (B) a compound that has two or more active hydrogen groups, (C) a compound that has one or more active hydrogen groups and one or more hydrophilic groups, and (D) a chain extending agent, or contains an aqueous resin composition containing a polymer of an unsaturated polymerizable monomer that is emulsified with the hydrophilic group-containing polyurethane.

14 Claims, No Drawings

BINDER FOR ELECTRODES OF LITHIUM SECONDARY BATTERIES, AND LITHIUM SECONDARY BATTERY WHICH USES ELECTRODE PRODUCED USING BINDER FOR ELECTRODES OF LITHIUM SECONDARY BATTERIES

TECHNICAL FIELD

The present invention relates to a binder for an electrode of a lithium secondary battery, and a lithium secondary battery using an electrode produced with the binder.

BACKGROUND ART

In recent years, portable electronic equipments, such as a portable telephone, a notebook computer, a personal digital assistant (PDA), a camcorder and a digital still camera, are largely spread, and with increasing demands of miniaturization and weight saving of the electronic equipments, a battery as a driving electric power source thereof receives increasing demands of miniaturization, weight saving, reduction in thickness and increase in capacity, for which studies are being actively made. A lithium secondary battery has a high voltage and a good energy density, and thus has been widely used as an electric power source of a portable electronic equipment. Associated with the development of the industry of displays having a small size and a light weight, however, there is a demand of a battery that has a smaller size and a lighter weight, and thus a lithium secondary battery is demanded to have enhanced battery characteristics including a higher driving voltage, a prolonged service lifetime and a higher energy density as compared to an ordinary lithium secondary battery. Middle-size or large-size lithium secondary batteries for automotive use, industrial use or the like are being developed in recent years, and there are expectations of developments for enhancing the capacity and the output power. For satisfying the demands, accordingly, there are being continuous efforts for enhancing the performances of the constitutional elements of the lithium battery.

The characteristics of the battery largely vary depending on the battery materials used, such as an electrode, an electrolyte and the like, and in particular, the characteristics of the electrode may be determined by an electrode active substance, a collector, and a binder, which imparts an adhesive force therebetween. For example, the amount and the species of the active substance used determine the amount of lithium ions capable of being bonded to the active substance, and thus a battery having a larger capacity may be obtained by using an active substance in a larger amount and by using an active substance having a larger inherent capacity. In the case where the binder has an excellent adhesive force between the active substances and between the active substance and the collector, electrons and lithium ions migrate smoothly within the electrode to reduce the internal resistance of the electrode, thereby performing charge and discharge with a high efficiency. A battery having a large capacity requires a composite electrode for an anode active substance, such as carbon and graphite, and carbon and silicon, which may suffer large volume expansion and contraction of the active substance on charge and discharge, and therefore the binder not only necessarily has an excellent adhesive force, but also necessarily has excellent elastic property and maintains the original adhesive force and restorative force even after undergoing considerable expansion and contraction of the electrode volume.

In view of the above points, a fluorine resin, such as polytetrafluoroethylene and polyvinylidene fluoride, dissolved in an organic solvent is used as a binder for providing an electrode. However, a fluorine resin may not have sufficiently high adhesiveness to a metal constituting a collector and may not have sufficiently high flexibility, and thus in production of a spiral wound battery, there are such problems that the resulting electrode layer suffers cracking, and the resulting electrode layer is released from the collector. Furthermore, the amount thereof used is necessarily large for maintaining the sufficient adhesive force, which may restrict miniaturization, and the use of the organic solvent mixed therewith disadvantageously makes the production process complicated.

A known binder that has high adhesiveness to a metal constituting the collector and is capable of forming a highly flexible electrode layer includes a binder formed of styrene-butadiene rubber (SBR) latex (see PTLs 1, 2 and 3). The binder is excellent in elastic characteristics but has a small adhesive force, and on repeated charge and discharge, the electrode fails to maintain the structure thereof, which may provide an insufficient service lifetime of the battery. In view of the demand of enhancement of the battery capacity in recent years, as for the materials constituting the electrode layer, the content of the binder component is decreased, and the electrode layer is press-molded in the production process of the electrode. In the electrode layer that has a small content of the binder component, however, the electrode layer is liable to be released from the collector in the press molding. The phenomenon not only causes contamination of the press molding machine with the electrode substance, but also provides such a problem that the reliability of the battery performance may be deteriorated when the electrode having an electrode layer that is partially released off is installed in the battery. The problem may be conspicuous when a polymer having a low glass transition temperature and high tackiness is used as the binder component, and thus the problem may be suppressed by using a latex formed of a polymer that has a high glass transition temperature, for example, higher than room temperature. However, the use of a binder formed of a polymer having a high glass transition temperature provides an electrode layer that has low flexibility and thus is liable to suffer cracking, which provides such a problem that the capacity retention of the battery is deteriorated to fail to provide sufficient charge and discharge cycle characteristics.

CITATION LIST

Patent Literatures

PTL 1: JP-A-5-21068
PTL 2: JP-A-11-7948
PTL 3: JP-A-2001-210318

SUMMARY OF INVENTION

Technical Problem

The invention has been made under the circumstances, and an object thereof is to provide a binder that has high adhesiveness to a collector, does not cause release in press molding, has high flexibility, and is excellent in binding capability and resistance to an electrolytic solution, and a lithium secondary battery that is excellent in charge and discharge characteristics using an electrode produced with the binder.

Solution to Problem

For achieving the object, the binder for an electrode of a lithium secondary battery of the invention contains a hydrophilic group-containing polyurethane that contains (A) a polyisocyanate, (B) a compound that has two or more active hydrogen groups, (C) a compound that has one or more active hydrogen groups and one or more hydrophilic groups, and (D) a chain extending agent.

In the binder for an electrode of the invention, the hydrophilic group-containing polyurethane is contained, for example, in the form of a water dispersion. In this case, (B) the compound that has two or more active hydrogen groups preferably contains one or more kinds selected from the group consisting of a polycarbonate polyol, a polyester polyol having an aromatic ring, and a polyether polyol having an aromatic ring. The hydrophilic group-containing polyurethane preferably has a crosslinking density of 0.01 or more and 0.50 or less per 1,000 atomic weight of the polyurethane.

The binder for an electrode of the invention may contain an aqueous resin composition containing a polymer of an unsaturated polymerizable monomer that is emulsified with the hydrophilic group-containing polyurethane.

The lithium secondary battery of the invention is constituted by using an electrode using the binder for an electrode of a lithium secondary battery of the invention.

Advantageous Effects of Invention

The binder for an electrode of a lithium secondary battery of the invention has high adhesiveness to a collector, does not cause release in press molding, has high flexibility, and is excellent in binding capability and resistance to an electrolytic solution. A lithium secondary battery that is excellent in charge and discharge characteristics may be obtained by using an electrode produced with the binder.

DESCRIPTION OF EMBODIMENTS

As described above, the binder for an electrode of a lithium secondary battery of the invention contains a hydrophilic group-containing polyurethane that contains (A) a polyisocyanate, (B) a compound that has two or more active hydrogen groups, (C) a compound that has one or more active hydrogen groups and one or more hydrophilic groups, and (D) a chain extending agent. Hereinafter, embodiments of the present invention will be described in detail.

The binder for an electrode of a lithium secondary battery of the invention, in one embodiment, contains a water dispersant of the hydrophilic group-containing polyurethane, and the component B contains a polycarbonate polyol, a polyester polyol having an aromatic ring, and/or a polyether polyol having an aromatic ring.

The polyisocyanate as the component A used in the invention is not particularly limited, and polyisocyanates that are ordinarily used in this field of art may be used. Specific examples thereof include an aliphatic polyisocyanate, an alicyclic polyisocyanate, an aromatic polyisocyanate and an aromatic aliphatic polyisocyanate. Examples of the aliphatic polyisocyanate include tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane 1,5-diisocyanate and 3-methylpentane 1,5-diisocyanate. Examples of the alicyclic polyisocyanate include isophorone diisocyanate, hydrogenated xylylene diisocyanate, 4,4'-dicyclohexylmethane diisocyanate, 1,4-cyclohexane diisocyanate, methylcyclohexylene diisocyanate and 1,3-bis(isocyanatemethyl)cyclohexane. Examples of the aromatic polyisocyanate include tolylene diisocyanate, 2,2'-diphenylmethane diisocyanate, 2,4'-diphenylmethane diisocyanate, 4,4'-diphenylmethane diisocyanate (MDI), 4,4'-dibenzyl diisocyanate, 1,5-naphthylene diisocyanate, xylylene diisocyanate, 1,3-phenylene diisocyanate and 1,4-phenylene diisocyanate. Examples of the aromatic aliphatic polyisocyanate include a dialkyldiphenylmethane diisocyanate, a tetraalkyldiphenylmethane diisocyanate and α,α,α,α-tetramethylxylylene diisocyanate. A modified product, such as a dimer, a trimer and a burette-modified isocyanate, of these organic polyisocyanates may also be used. These compounds may be used solely or as a combination of two or more kinds thereof. Among these polyisocyanates, an alicyclic isocyanate and/or an aromatic isocyanate are preferred from the standpoint of the binding capability and the resistance to an electrolytic solution, and specifically 4,4'-dicyclohexylmethane diisocyanate, isophorone diisocyanate and 1,3-bis(isocyanatemethyl)cyclohexane are preferred. The content of the component A is preferably in a range of from 1/0.85 to 1/1.1 in terms of equivalent ratio of the isocyanate groups to the total amount of active hydrogen groups of the component B and the component C.

Preferred examples of the compound that has two or more active hydrogen groups as the component B used in the invention include a polycarbonate polyol, a polyester polyol having an aromatic ring, and/or a polyether polyol having an aromatic ring.

The polycarbonate polyol used may be a polycarbonate polyol that is ordinarily used in this field of art without particular limitation. Specific examples thereof include carbonate polyol of 1,6-hexanediol, carbonate polyol of 1,4-butanediol and 1,6-hexanediol, carbonate polyol of 1,5-pentanediol and 1,6-hexanediol, and carbonate polyol of 3-methyl-1,5-pentanediol and 1,6-hexanediol. Examples of the commercially available product thereof include PCDL T-6001, T-6002, T-5651, T-5652, T-5650J, T-4671 and T-4672, produced by Asahi Kasei Chemicals Corporation, Kuraray Polyol C-590, C-1050, C-1050R, C-1090, C-2050, C-2050R, C-2070, C-2070R, C-2090, C-2090R, C-3090, C-3090R, C-4090, C-4090R, C-5090, C-5090R, C-1065N, C-2065N, C-1015N and C-2015N, produced by Kuraray Co., Ltd., and ETERNACOLL UH-50, UH-100, UH-200, UH-300, UM-90(3/1), UM-90(1/1), UM-90(1/3) and UC-100, produced by Ube Industries, Ltd.

The polyester polyol having an aromatic ring may be generally obtained through condensation reaction of a dibasic acid and a dihydric alcohol. The dibasic acid is not particularly limited, and specific examples thereof include an aromatic dibasic acid, such as phthalic acid, isophthalic acid, terephthalic acid, 1,4-naphthalenedicarboxylic acid and 2,6-naphthalenedicarboxylic acid. The dihydric alcohol is not particularly limited, and specific examples thereof include an aliphatic glycol, such as ethylene glycol, diethylene glycol, triethylene glycol, propylene glycol, 1,4-butanediol, 1,5-pentanediol, 1,6-hexanediol and 3-methyl-1,5-pentanediol, an alicyclic glycol, such as cyclohexanediol, and an aromatic glycol, such as an alkylene oxide adduct of bisphenol A.

Examples of the polyether polyol having an aromatic ring include an alkylene oxide adduct (such as an ethylene oxide adduct and a propylene oxide adduct) of bisphenol A.

As the component B, a polyester polyol and a polyether polyol may be used in combination with the aforementioned compounds in such a range that does not impair the effect obtained by the invention. Specific examples of the polyester polyol include a polyhydric alcohol, such as ethylene glycol, propylene glycol, propanediol, butanediol, pentanediol, 3-methyl-1,5-pentanediol, hexanediol, neopentyl glycol, diethylene glycol, triethylene glycol, tetraethylene glycol, polyethylene glycol, dipropylene glycol, tripropylene glycol, 1,4-cyclohexanedimethanol, bisphenol A, bisphenol F, bisphenol S, hydrogenated bisphenol A, dibromobisphenol A, dihydroxyethyl terephthalate, hydroquinone dihydroxyethyl ether, trimethylolpropane, glycerin and pentaerythritol, and an ester compound of an oxyalkylene derivative thereof and a polybasic carboxylic acid, a polybasic carboxylic acid anhydride or a polybasic carboxylate ester. Specific examples of the polyether polyol include a compound derived from, as a starting substance, a triol compound, such as glycerin, hexanetriol, trimethylolethane and trimethylolpropane, and an alkanolamine, such as triethanolamine, triisopropanolamine and tributanolamine. Examples thereof also include a compound derived from, as a starting substance, pentaerythritol as a tetrahydric alcohol component. The polyether polyol may be synthesized through polyaddition of an alkylene oxide with the polyhydric alcohol as a starting substance in the presence of a basic catalyst. Examples of the alkylene oxide include ethylene oxide, propylene oxide, butylene oxide and tetrahydrofuran.

The polycarbonate polyol, the polyester polyol having an aromatic ring, and/or the polyether polyol having an aromatic ring preferably have a number average molecular weight of 300 or more and 3,000 or less. When the number average molecular weight is less than 300, the binding capability may be lowered, and when the number average molecular weight exceeds 3,000, the resistance to an electrolytic solution tends to be lowered.

To the component B, a single chain low molecular weight diol, such as ethylene glycol, 1,4-butanediol and 1,4-cyclohexanedimethanol, may be added for localizing urethane bonds in the molecule.

As the component B, a polyhydric alcohol and/or an oxyalkylene derivative of a polyhydric alcohol may be used for introducing a branched structure in the molecule. Specific examples thereof include a polyhydric alcohol, such as trimethylolpropane, glycerin and pentaerythritol, oxyalkylene derivatives thereof, and an ester compound of the polyhydric alcohol or the oxyalkylene derivative thereof and a polybasic carboxylic acid, a polybasic carboxylic acid anhydride or a polyhydric carboxylate ester. It is preferred that a branched structure is introduced to the polyurethane to localize urethane bonds, thereby providing such an effect that an electrode using a binder containing the polyurethane water dispersion has an enhanced resistance to an electrolytic solution.

The content of the component B is preferably 30% by mass or more and 75% by mass or less with respect to the polyurethane in the polyurethane water dispersion. When the content is less than 30% by mass, the binding capability may be lowered, and when the content exceeds 75% by mass, the resistance to an electrolytic solution tends to be lowered.

The component C used in the invention is a compound that has one or more active hydrogen groups and one or more hydrophilic groups. Examples of the hydrophilic group include an anionic hydrophilic group, a cationic hydrophilic group and a nonionic hydrophilic group, specific examples of the anionic hydrophilic group include a carboxyl group and a salt thereof, and a sulfonic acid group and a salt thereof, specific examples of the cationic hydrophilic group include a tertiary ammonium salt and a quaternary ammonium salt, and specific examples of the nonionic hydrophilic group include a group containing a repeating unit of ethylene oxide, and a group containing a repeating unit of ethylene oxide and a repeating unit of another alkylene oxide.

Examples of the compound that has one or more active hydrogen groups and one or more carboxyl groups include a carboxylic acid-containing compound, such as 2,2-dimethylolpropionic acid, 2,2-dimethylolbutyric acid, 2,2-dimethylolvaleric acid, dioxymaleic acid, 2,6-dioxybenzoic acid and 3,4-diaminobenzoic acid, a derivative thereof, and a salt thereof, and also include a polyester polyol obtained therewith. Examples thereof also include an amino acid compound, such as alanine, aminobutyric acid, aminocaproic acid, glycine, glutamic acid, aspartic acid and histidine, and a carboxylic acid compound, such as succinic acid, adipic acid, maleic anhydride, phthalic acid and trimellitic anhydride.

Examples of the compound that has one or more active hydrogen groups and one or more sulfonic acid groups (or salts thereof) include a sulfonic acid-containing compound and a derivative thereof, such as 2-oxyethanesulfonic acid, phenolsulfonic acid, sulfobenzoic acid, sulfosuccinic acid, 5-sulfoisophthalic acid, sulfanilic acid, 1,3-phenylenediamine-4,6-disulfonic acid and 2,4-diaminotoluene-5-sulfonic acid, and a polyester polyol, a polyamide polyol and a polyamide polyester polyol, which are obtained through copolymerization of these compounds.

The carboxyl group or the sulfonic acid group is then neutralized to form a salt, thereby making the polyurethane finally obtained water-dispersible. Examples of the neutralizing agent in this case include a nonvolatile base, such as sodium hydroxide and potassium hydroxide, a tertiary amine compound, such as trimethylamine, triethylamine, dimethylethanolamine, methyldiethanolamine and triethanolamine, and a volatile base, such as ammonia. The neutralization may be performed either before the urethanization reaction, during the reaction or after the reaction.

Examples of the compound that has one or more active hydrogen groups and one or more tertiary ammonium salts include an alkanolamine, such as methylaminoethanol and methyldiethanolamine. The compound may be neutralized with an organic carboxylic acid, such as formic acid and acetic acid, or an inorganic acid, such as hydrochloric acid and sulfuric acid, to form a salt, thereby making the polyurethane water-dispersible. The neutralization may be performed either before the urethanization reaction, during the reaction or after the reaction. Among these, a compound obtained through neutralization of methyldiethanolamine with an organic carboxylic acid is preferred from the standpoint of the easiness of emulsification.

The compound that has one or more active hydrogen groups and one or more quaternary ammonium salts include a compound obtained through quaternarization of the aforementioned alkanolamine, such as methylaminoethanol and methyldiethanolamine, with a halogenated alkyl, such as methyl chloride and methyl bromide, or a dialkylsulfuric acid, such as dimethylsulfuric acid. Among these, a compound obtained through quaternarization of methyldiethanolamine with dimethylsulfuric acid is preferred from the standpoint of the easiness of emulsification.

The compound that has one or more active hydrogen groups and one or more nonionic hydrophilic groups is not particularly limited, and a compound that contains 30% by mass or more of a repeating unit of ethylene oxide and has a number average molecular weight of from 300 to 20,000 is preferred, examples of which include a nonionic group-containing compound, such as polyoxyethylene glycol, polyoxyethylene-polyoxypropylene copolymer glycol, polyoxyethylene-polyoxybutylene copolymer glycol, polyoxyethylene-polyoxyalkylene copolymer glycol and monoalkyl ethers thereof, and a polyester polyether polyol obtained through copolymerization thereof.

The compounds as the component C may be used solely or as a combination thereof.

The content of the component C is preferably from 5 to 50 mgKOH/g, and more preferably from 5 to 45 mgKOH/g, for the anionic hydrophilic group-containing compound in terms of acid value showing the content of the anionic hydrophilic group. When the acid value is less than 5 mgKOH/g, there may be a problem that the polyurethane is difficult to be dispersed in water. When the acid value exceeds 50 mgKOH/g, there may be a problem that the resistance to an electrolytic solution is lowered. The acid value may be obtained in terms of the amount of KOH (mg) that is required for neutralizing the free carboxyl group contained in 1 g in terms of solid content of the polyurethane water dispersion according to JIS K0070-1992. In the case where the nonionic group-containing compound is used, the amount thereof used is preferably from 1 to 30% by mass, and particularly preferably from 5 to 20% by mass, in the polyurethane in the polyurethane water dispersion. Among these, the component C is preferably a compound that has one or more active hydrogen groups and one or more carboxyl groups in a molecule from the standpoint of the adhesiveness to a collector.

The component D used may be a chain extending agent that is ordinarily used in this field of art and is not particularly limited, and specific examples thereof used include a diamine and a polyamine. Examples of the diamine include ethylenediamine, trimethylenediamine, piperazine and isophoronediamine. Examples of the polyamine include diethylenetriamine, dipropylenetriamine and triethylenetetramine. The component D preferably contains a trifunctional or higher functional polyamine for introducing an internal crosslinked structure to the polyurethane, thereby enhancing the resistance to an electrolytic solution. Specific examples of the polyamine include the polyamines described above. The content of the component D is preferably such an amount that provides an equivalent ratio to the isocyanate group of the component A in a range of from 1/0.5 to 1/0.9 in terms of isocyanate group/(D) chain extending agent.

The number average molecular weight of the polyurethane of the polyurethane water dispersion in the invention is preferably as large as possible by introducing a branched structure and an internal crosslinked structure, and is preferably 50,000 or more. This is because insolubility thereof in a solvent with a large molecular weight may provide a coated film that is excellent in resistance to an electrolytic solution.

The production method of the polyurethane water dispersion in the invention is not particularly limited. In general, (B) the compound that has two or more active hydrogen groups, (C) the compound that has one or more active hydrogen groups and one or more hydrophilic groups, and (D) the chain extending agent are reacted with the polyisocyanate as the component A in an amount that is stoichiometrically excessive to the total amount of the active hydrogen group having reactivity with the isocyanate group contained in the components B, C and D (where the equivalent ratio of the isocyanate group and the active hydrogen group is preferably from 1/0.85 to 1/1.1) without a solvent or in an organic solvent having no active hydrogen group to synthesize a urethane prepolymer having an isocyanate terminal, and after neutralizing or quaternarizing the anionic hydrophilic group or the cationic hydrophilic group of the component C depending on necessity, the prepolymer is emulsified in water. Thereafter, the chain extending agent as the component D in an equivalent amount that is smaller than the residual isocyanate group (where the equivalent ratio of the isocyanate group and the chain extending agent is preferably from 1/0.5 to 1/0.9) is added thereto, and the isocyanate group in the emulsion micelle and the chain extending agent as the component D are subjected to interfacial polymerization to form a urea bond. According to the procedure, the crosslinking density in the emulsion micelle is increased, and a three-dimensional crosslinked structure is formed. The formation of the three-dimensional crosslinked structure provides a coated film exhibiting excellent resistance to an electrolytic solution. Thereafter, the solvent, which is used depending on necessity, is removed, and thereby the polyurethane water dispersion can be provided. The chain extension may be performed with water molecules present in the system on dispersing and emulsifying in water, without the use of the polyamine or the like as the component D.

In the synthesis of the urethane prepolymer described above, such a solvent may be used that is inactive to an isocyanate group and is capable of dissolving the urethane prepolymer thus formed. Examples of the solvent include dioxane, methyl ethyl ketone, dimethylformamide, tetrahydrofuran, N-methyl-2-pyrrolidine, toluene and propylene glycol monomethyl ether acetate. These hydrophilic organic solvents used in the reaction are preferably removed finally.

The average particle diameter of the polyurethane water dispersion used in the invention is preferably in a range of from 0.005 to 0.5 µm from the standpoint of the addition amount, the coating property and the binding capability.

The polyurethane of the polyurethane water dispersion used in the invention preferably has a crosslinking density of from 0.01 to 0.50 per 1,000 atomic weight of the polyurethane. The crosslinking density referred herein is a value obtained by calculating based on the expression 1 shown below. Specifically, the crosslinking density per 1,000 molecular weight of the resin solid content contained in the polyurethane water dispersion, which is obtained through reaction of $W_{A1}$ g of (A) the polyisocyanate having a molecular weight $MW_{A1}$ and a functional group number of $F_{A1}$, $W_{A2}$ g of (A) the polyisocyanate having a molecular weight $MW_{A2}$ and a functional group number of $F_{A2}$, $W_{Aj}$ g of (A) the polyisocyanate having a molecular weight $MW_{Aj}$ and a functional group number of $F_{Aj}$ (wherein j represents an integer of 1 or more), $W_{B1}$ g of (B) the active hydrogen-containing compound having a molecular weight $MW_{B1}$ and a functional group number of $F_{B1}$, $W_{B2}$ g of (B) the active hydrogen-containing compound having a molecular weight $MW_{B2}$ and a functional group number of $F_{B2}$, $W_{Bk}$ g of (B) the active hydrogen-containing compound having a molecular weight $MW_{Bk}$ and a functional group number of $F_{Bk}$ (wherein k represents an integer of 1 or more), $W_{C1}$ g of (C) the compound having one or more active hydrogen groups and one or more hydrophilic groups having a molecular weight $MW_{C1}$ and a functional group number of $F_{C1}$, $W_{Cm}$ g of (C) the compound having one or more active hydrogen groups and one or more hydrophilic groups having a molecular weight $MW_{Cm}$ and a functional group number of $F_{Cm}$ (wherein m represents an integer of 1 or more), $W_{D1}$ g of (D) the chain extending agent having a molecular weight $MW_{D1}$ and a functional group number of $F_{D1}$, and $W_{Dn}$ g of (D) the chain extending agent having a molecular weight $MW_{Dn}$ and a functional group number of $F_{Dn}$ (wherein n represents an integer of 1 or more), may be obtained according to the following expression.

$$\text{crosslinking density} = \left( \frac{\begin{array}{l}\{W_{A1}(F_{A1}-2)/MW_{A1}\}+ \\ \{W_{A2}(F_{A2}-2)/MW_{A2}\}+\ldots+ \\ \{W_{Aj}(F_{Aj}-2)/MW_{Aj}\}\end{array}}{\begin{array}{l}(W_{A1}+W_{A2}+\ldots+W_{Aj})+ \\ (W_{B1}+W_{B2}+\ldots+W_{Bk})+ \\ (W_{C1}+\ldots+W_{Cm})+ \\ (W_{D1}+\ldots+W_{Dn})\end{array}} \right. \quad \text{[Expression 1]}$$

$$+ \frac{\begin{array}{l}\{W_{B1}(F_{B1}-2)/MW_{B1}\}+ \\ \{W_{B2}(F_{B2}-2)/MW_{B2}\}+\ldots+ \\ \{W_{Bk}(F_{Bk}-2)/MW_{Bk}\}\end{array}}{\begin{array}{l}(W_{A1}+W_{A2}+\ldots+W_{Aj})+ \\ (W_{B1}+W_{B2}+\ldots+W_{Bk})+ \\ (W_{C1}+\ldots+W_{Cm})+ \\ (W_{D1}+\ldots+W_{Dn})\end{array}}$$

$$+ \frac{\begin{array}{l}\{W_{C1}(F_{C1}-2)/MW_{C1}\}+\ldots+ \\ \{W_{Cm}(F_{Cm}-2)/MW_{Cm}\}\end{array}}{\begin{array}{l}(W_{A1}+W_{A2}+\ldots+W_{Aj})+ \\ (W_{B1}+W_{B2}+\ldots+W_{Bk})+ \\ (W_{C1}+\ldots+W_{Cm})+ \\ (W_{D1}+\ldots+W_{Dn})\end{array}}$$

$$\left. + \frac{\begin{array}{l}\{W_{D1}(F_{D1}-2)/MW_{D1}\}+\ldots+ \\ \{W_{Dn}(F_{Dn}-2)/MW_{Dn}\}\end{array}}{\begin{array}{l}(W_{A1}+W_{A2}+\ldots+W_{Aj})+ \\ (W_{B1}+W_{B2}+\ldots+W_{Bk})+ \\ (W_{C1}+\ldots+W_{Cm})+ \\ (W_{D1}+\ldots+W_{Dn})\end{array}} \right) \times 1000$$

When the crosslinking density is less than 0.01, there may be a tendency that the resistance to an electrolytic solution and the heat resistance are deteriorated, and when it exceeds 0.50, there may be a tendency that the urethane resin is reduced in flexibility and is also reduced in binding capability.

The polyurethane water dispersion of the invention preferably has a urethane bond amount in the polyurethane of from 150 to 2,000 g/eq, and more preferably from 200 to 1,000 g/eq. When the urethane bond amount is less than 150 g/eq, the polyurethane may be reduced in flexibility and thus may be reduced in binding capability due to the too large urethane bond amount, and when it exceeds 2,000 g/eq, there may be a tendency that the resistance to an electrolytic solution and the heat resistance are deteriorated.

In the polyurethane water dispersion of the invention, the urea bond amount in the polyurethane is preferably from 300 to 20,000 g/eq, and more preferably from 400 to 10,000 g/eq. When the urea bond amount is less than 300 g/eq, the polyurethane may be reduced in flexibility and thus may be reduced in binding capability due to the too large urea bond amount, and when it exceeds 20,000 g/eq, there may be a possibility of causing deterioration in workability in synthesis, and there may be a tendency that the resistance to an electrolytic solution and the heat resistance are deteriorated.

In the polyurethane water dispersion of the invention, the total content of the aromatic ring and the alicyclic ring in the polyurethane is preferably from 10 to 60% by mass, and more preferably from 20 to 60% by mass. When the total content of the aromatic ring and the alicyclic ring in the polyurethane is less than 10% by mass, the resistance to an electrolytic solution may be deteriorated, and when it exceeds 60% by mass, there may be a tendency that the polyurethane is reduced in flexibility.

In the invention, a crosslinking agent may also be used in the polyurethane water dispersion. Specific examples of the crosslinking agent include aziridine, oxazoline, modified polyisocyanate and polyepoxide compounds, and the crosslinking agents may be used solely or as a combination thereof.

In another (second) embodiment of the invention, the binder for an electrode contains the hydrophilic group-containing polyurethane that has a crosslinking density of 0.01 or more and 0.50 or less per 1,000 atomic weight of the polyurethane.

In this case, the component A, the component C and the component D used may be the same as described for the first embodiment, and the preferred ranges of the contents are also the same.

As the compound that has two or more active hydrogen groups as the component B, for example, a wide range of compounds that have two or more hydroxyl groups, amino groups or mercapto groups at a molecular terminal or in a molecule may be used, and known polyether, polyester, polyether ester, polycarbonate, polythioether, polyacetal, polyolefin, polysiloxane, fluorine and vegetable oil compounds may be used. Specific examples thereof include a polyhydric alcohol, such as ethylene glycol, propylene glycol, propanediol, butanediol, pentanediol, 3-methyl-1,5-pentanediol, hexanediol, neopentyl glycol, diethylene glycol, triethylene glycol, tetraethylene glycol, polyethylene glycol, dipropylene glycol, tripropylene glycol, 1,4-cyclohexanedimethanol, bisphenol A, bisphenol F, bisphenol S, hydrogenated bisphenol A, dibromobisphenol A, dihydroxyethyl terephthalate, hydroquinone dihydroxyethyl ether, trimethylolpropane, glycerin and pentaerythritol, oxyalkylene derivatives thereof, and an ester compound of the polyhydric alcohol or an oxyalkylene derivative thereof and a polybasic carboxylic acid, a polybasic carboxylic acid anhydride or a polybasic carboxylate ester, and a polyol compound, such as a polycarbonate polyol, a polycaprolactone polyol, a polyester polyol, a polythioether polyol, a polyacetal polyol, a polytetramethylene glycol, a polybutadiene polyol, a castor oil polyol, a soybean oil polyol, a fluorine polyol and a silicone polyol, and modified products thereof. Examples of the alkylene oxide include ethylene oxide, propylene oxide and butylene oxide. The compound that has two or more active hydrogen groups may be used solely or as a combination of two or more kinds thereof.

Among these, a compound having two or more hydroxyl groups at molecular terminals is preferred, and examples thereof include ethylene glycol, propylene glycol, propanediol, butanediol, pentanediol, 3-methyl-1,5-pentanediol, hexanediol, neopentyl glycol, diethylene glycol, triethylene glycol, tetraethylene glycol, polyethylene glycol, dipropylene glycol, tripropylene glycol, 1,4-cyclohexanedimethanol, bisphenol A, bisphenol F, bisphenol S, hydrogenated bisphenol A, dibromobisphenol A, 1,4-cyclohexanedimethanol, dihydroxyethyl terephthalate, hydroquinone dihydroxyethyl ether, and oxyalkylene derivatives thereof, a polycarbonate polyol, a polycaprolactone polyol, a polyester polyol, a polythioether polyol, a polyacetal polyol, a polytetramethylene glycol and a polybutadiene polyol. Examples of the alkylene oxide for the oxyalkylene derivative include ethylene oxide, propylene oxide and butylene oxide.

The component B preferably contains a compound that has three or more active hydrogen groups having reactivity with the isocyanate group, for introducing a branched structure to the polyurethane. Specific examples thereof include a polyhydric alcohol, such as trimethylolpropane, glycerin and pentaerythritol, oxyalkylene derivatives thereof, and an ester compound of the polyhydric alcohol or the oxyalkylene derivative thereof and a polybasic carboxylic acid, a polybasic carboxylic acid anhydride or a polyhydric carboxylate ester. The component B may contain a single chain low molecular weight diol, such as ethylene glycol, 1,4-butanediol and 1,4-cyclohexanedimethanol, for localizing urethane bonds in the polyurethane. It is preferred as described above that a branched structure is introduced to the polyurethane to localize urethane bonds, thereby providing such an effect that an electrode using a binder containing the urethane water dispersion has an enhanced resistance to an electrolytic solution.

The number average molecular weight of the component B is not particularly limited and is preferably 50 or more and 5,000 or less.

The content of the component B in the polyurethane contained in the polyurethane water dispersion is not particularly limited and is preferably from 30 to 75% by mass from the standpoint that both the binding capability and the resistance to an electrolytic solution are achieved.

The polyurethane water dispersion in the second embodiment may be produced in a manner similar to the first embodiment.

The number average molecular weight of the polyurethane of the polyurethane water dispersion is preferably 50,000 or more due to the same reasons as described above. The polyurethane preferably has a crosslinking density of from 0.01 to 0.50 per 1,000 molecular weight of the polyurethane, as similar to the above. The polyurethane preferably has a urethane bond amount of from 150 to 2,000 g/eq, and more preferably from 200 to 1,000 g/eq, as similar to the above. The polyurethane preferably has a urea bond amount of from 300 to 20,000 g/eq, and more preferably from 400 to 10,000 g/eq, as similar to the above.

In still another (third) embodiment of the invention, the binder for an electrode contains an aqueous resin composition containing a polymer of an unsaturated polymerizable monomer that is emulsified with the hydrophilic group-containing polyurethane.

The polymer of an unsaturated polymerizable monomer is not particularly limited as far as it is constituted by an unsaturated polymerizable monomer (a), and examples of the unsaturated polymerizable monomer (a) include a carboxylic acid group-containing unsaturated polymerizable monomer, and an alkyl ester and a vinyl compound of a carboxylic acid group-containing unsaturated polymerizable monomer.

Examples of the carboxylic acid group-containing unsaturated polymerizable monomer include (meth)acrylic acid, which includes methacrylic acid, crotonic acid, maleic acid and itaconic acid. Examples of the alkyl ester of a carboxylic acid group-containing unsaturated polymerizable monomer include a mono(meth)acrylate ester, such as methyl(meth)acrylate, ethyl(meth)acrylate, propyl(meth)acrylate, isopropyl(meth)acrylate, butyl(meth)acrylate, n-butyl(meth)acrylate, isobutyl(meth)acrylate, hexyl(meth)acrylate, 2-ethylhexyl(meth)acrylate, octyl(meth)acrylate, nonyl(meth)acrylate, decyl(meth)acrylate, stearyl(meth)acrylate, isostearyl(meth)acrylate, lauryl(meth)acrylate, cyclohexyl(meth)acrylate, t-butylcyclohexyl(meth)acrylate, isobornyl(meth)acrylate, adamantyl(meth)acrylate, bicyclo[3,3,1]nonyl(meth)acrylate, 2-methoxyethyl(meth)acrylate, tetrahydrofurfuryl(meth)acrylate, benzyl(meth)acrylate, allyl(meth)acrylate, diethylaminoethyl(meth)acrylate, 2-hydroxyethyl(meth)acrylate, 2-hydroxypropyl(meth)acrylate, 3-hydroxypropyl(meth)acrylate, 4-hydroxybutyl(meth)acrylate, methoxyethylene glycol(meth)acrylate, methoxypolyethylene glycol(meth)acrylate, ethoxyethylene glycol(meth)acrylate, ethoxypolyethylene glycol(meth)acrylate, propoxyethylene glycol(meth)acrylate, propoxypolyethylene glycol(meth)acrylate, methoxypropylene glycol(meth)acrylate, methoxypolypropylene glycol(meth)acrylate, ethoxypropylene glycol(meth)acrylate, ethoxypolypropylene glycol(meth)acrylate, propoxypropylene glycol(meth)acrylate, propoxypolypropylene glycol(meth)acrylate and phenoxyethylene glycol(meth)acrylate, a di(meth)acrylate compound, such as ethylene glycol di(meth)acrylate, polyethylene glycol di(meth)acrylate, propylene glycol di(meth)acrylate, polypropylene glycol di(meth)acrylate and triethylene glycol di(meth)acrylate, a tri(meth)acrylate compound, such as trimethylolpropane tri(meth)acrylate and glycerin tri(meth)acrylate, a tetra(meth)acrylate compound, such as pentaerythritol tetra(meth)acrylate, and a hexa(meth)acrylate compound, such as sorbitol hexa(meth)acrylate. Examples of the vinyl compound of a carboxylic acid group-containing unsaturated polymerizable monomer include vinyl acetate, vinyl propionate and 2-(meth)acryloyloxyethyl phthalate. Other examples of the unsaturated polymerizable monomer include styrene, α-methylstyrene, vinyltoluene, acrylonitrile, methacrylonitrile, butadiene and isoprene. The unsaturated polymerizable monomers (a) may be used solely or as a combination of two or more kinds thereof. In the unsaturated polymerizable monomers (a), methyl(meth)acrylate, phenoxyethylene glycol(meth)acrylate, styrene and butadiene are preferred from the standpoint of the influence on the resistance to an electrolytic solution and the raw material cost.

In the polymerization of the unsaturated polymerizable monomer (a), polymerization reaction may be performed by adding a known polymerization initiator (c). Examples of the polymerization initiator (c) used include an azo initiator, such as 2,2'-asobisisobutyronitrile, 2,2'-azobis(2-methylpropionamidine)disulfate, 2,2'-azobis(2-amidinopropane)dihydrochloride, 2,2'-azobis(2-(5-methyl-2-imidazolin-2-yl)propane)dihydrochloride and 2,2'-azobis(N,N'-dimethyleneisobutylamidine); and a substituted ethane initiator, such as phenyl-substituted ethane. Examples thereof used also include a redox initiator obtained by combination of a peroxide initiator, such as a persulfate salt, such as potassium persulfate, sodium persulfate and ammonium persulfate, and a peroxide, such as hydrogen peroxide, t-butylhydro peroxide, and cumene hydroperoxide, and a reducing agent, such as a sulfite salt, such as sodium sulfite, a hydrogen sulfate salt, such as sodium hydrogen sulfate, a metal salt, such as cuprous sulfate and ferrous sulfate, and an organic reducing agent, such as L-ascorbic acid.

The polymerization method utilized therefor may be known emulsion polymerization. The polymerization temperature may be controlled depending on the species of the polymerization initiator, and is preferably, for example, from 20 to 100° C. The amount of the polymerization initiator (c) used is generally suitably from 0.005 to 1 part by mass per 100 parts by mass of the unsaturated polymerizable monomer (a).

In the polymerization of the unsaturated polymerizable monomer (a), an emulsifier for emulsion polymerization may be used in combination. Examples of the emulsifier for emulsion polymerization include an unreactive one and a reactive one, and examples of each of them include anionic, nonionic and cationic emulsifiers for emulsion polymerization. The emulsifier may be appropriately selected depending on the species of the hydrophilic group of the hydrophilic group-containing polyurethane. The anionic reactive surfactant used in the invention is not particularly limited, and specific examples thereof include Adecalia Soap SR-10, SR-20 and SE-10N (produced by Adeka Corporation), Aqualon HS-10, HS-20, KH-05 and KH-10 (produced by Dai-ichi Kogyo Seiyaku Co., Ltd.), Eleminol JS-2 (produced by Sanyo Chemical Industries, Ltd.), and Latemul PD-104 (produced by Kao Corporation). The nonionic reactive surfactant used in the invention is not particularly limited, and specific examples thereof include Adekasoap ER-10 and ER-20 (produced by Adeka Corporation), Aqualon RN-10, RN-20, RN-30 and RN-50 (produced by Dai-ichi Kogyo Seiyaku Co., Ltd.), and Latemul PD-420 and PD-430 (produced by Kao Corporation).

The hydrophilic group-containing polyurethane used in the invention is formed of (A) the polyisocyanate, (B) the compound that has two or more active hydrogen groups, (C) the compound that has one or more active hydrogen groups and one or more hydrophilic groups, and (D) the chain extending agent, as similar to the first and second embodiments.

(A) The polyisocyanate is not particularly limited as similar to the first and second embodiments, and polyisocyanates that are ordinarily used in this field of art may be used. Specific examples thereof include those described for the first embodiment, and preferred examples thereof are also the same. They may be used solely or as a combination of two or more kinds thereof. The preferred content thereof is also the same as above.

The component B is not particularly limited, and a wide range of compounds that have two or more hydroxyl groups, amino groups or mercapto groups at a molecular terminal or in a molecule may be used. Specific examples thereof include those described for the second embodiment, and preferred examples thereof are also the same. The compounds may be used solely or as a combination of two or more kinds thereof.

The component B preferably contains a polycarbonate polyol, a polyester polyol having an aromatic ring, and/or a polyether polyol having an aromatic ring. Specific examples thereof include those described for the second embodiment, and preferred examples thereof are also the same. The compounds may be used solely or as a combination of two or more kinds thereof.

The number average molecular weight of the component B is not particularly limited and is preferably 50 or more and 5,000 or less. The content of the component B in the polyurethane contained in the polyurethane water dispersion is not particularly limited and is preferably from 40 to 75% by mass from the standpoint that both the binding capability and the resistance to an electrolytic solution are achieved.

The compound that has one or more hydrophilic groups and one or more active hydrogen groups as the component C used in the invention may be the same as those exemplified for the first embodiment, and the compounds may be used solely or as a combination of two or more kinds thereof. The preferred content of the component C is also the same as above.

The chain extending agent as the component D used may be, as similar to the above, chain extending agents that are ordinarily used in this field of art, and among them, a diamine and a polyamine described above are preferably used.

The number average molecular weight of the polyurethane of the polyurethane water dispersion of the invention is preferably 50,000 or more due to the same reasons as described above.

The production method of the aqueous resin composition in the invention is not particularly limited, and the aqueous resin composition may be produced, for example, in the following manner. The compound (B) that has two or more active hydrogen groups, the compound (C) that has one or more active hydrogen groups and one or more hydrophilic groups, and the chain extending agent (D) are reacted with the polyisocyanate (A) in an amount that is stoichiometrically excessive to the total amount of the active hydrogen group contained in the components B, C and D (where the equivalent ratio of the isocyanate group and the reactive functional group is preferably from 1/0.85 to 1/1.1) without a solvent or in an organic solvent having no active hydrogen group to synthesize a urethane prepolymer having an isocyanate terminal, and after neutralizing or quaternarizing the anionic hydrophilic group or the cationic hydrophilic group of the component C depending on necessity, an unsaturated polymerizable monomer is added thereto, and then the prepolymer is emulsified in water. Thereafter, (D) the chain extending agent in an equivalent amount that is smaller than that of the residual isocyanate group (where the equivalent ratio of the isocyanate group and the chain extending agent is preferably from 1/0.5 to 1/0.9) is added thereto, and the isocyanate group in the emulsion micelle and (D) the chain extending agent are subjected to interfacial polymerization to form a urea bond. Simultaneously with the chain extension or after the chain extension, the unsaturated polymerizable monomer is polymerized to form a polymer of an unsaturated polymerizable monomer, and the organic solvent is distilled off under reduced pressure, thereby producing the aqueous resin composition containing the polymer of an unsaturated polymerizable monomer of the invention that is emulsified with the hydrophilic group-containing polyurethane of the invention. The chain extension may be performed with water molecules present in the system on dispersing and emulsifying in water, without the use of the polyamine or the like as the component D.

The aqueous resin composition of the invention preferably has a mass ratio (X)/(Y) of the polymer of an unsaturated polymerizable monomer (X) and the hydrophilic group-containing polyurethane (Y) of from 90/10 to 1/99, and more preferably from 80/20 to 10/90.

In the synthesis of the urethane prepolymer, such a solvent may be used that is inactive to an isocyanate group and is capable of dissolving the urethane prepolymer thus formed. Examples of the solvent include dioxane, methyl ethyl ketone, dimethylformamide, tetrahydrofuran, N-methyl-2-pyrrolidine, toluene and propylene glycol monomethyl ether acetate. The solvent used in the reaction is preferably removed finally.

The crosslinking density of the hydrophilic group-containing polyurethane used in the invention may be obtained in a manner similar to above, and is preferably from 0.01 to 0.50 per 1,000 molecular weight of the polyurethane due to the same reasons as above.

The urethane bond amount of the hydrophilic group-containing polyurethane is preferably from 150 to 2,000 g/eq, and more preferably from 200 to 1,000 g/eq, due to the same reasons as above.

The lithium secondary battery of the invention will be described. A positive electrode and a negative electrode used in the lithium secondary battery of the invention each are constituted by an electrode active substance, a conductive agent, a collector for the electrode active substance, a binder for binding the electrode active substance and the conductive agent to the collector, and the like.

The lithium secondary battery of the invention is constituted of an electrode that is produced by using a binder containing the polyurethane water dispersion or the aqueous resin composition of the invention. The binder may be used in both a positive electrode and a negative electrode.

In the lithium secondary battery of the invention, the binder for an electrode that does not use the polyurethane water dispersion or the aqueous resin composition may be such polymers as polyvinylidene fluoride, a copolymer resin, such as a copolymer of polyvinylidene fluoride with one or more of hexafluoropropylene, perfluoromethyl vinyl ether and tetrafluoroethylene, a fluorine resin, such as polytetrafluoroethylene and fluorine rubber, and styrene-butadiene rubber, ethylene propylene rubber, and a styrene-acrylonitrile copolymer, but is not limited thereto.

The positive electrode active substance used in the positive electrode of the lithium secondary battery of the invention is not particularly limited as far as it can perform occlusion and release of lithium ion. Examples thereof include a metal oxide, such as $CuO$, $Cu_2O$, $MnO_2$, $MoO_3$, $V_2O_5$, $CrO_3$, $MoO_3$, $Fe_2O_3$, $Ni_2O_3$ and $CoO_3$, a composite oxide of lithium and a transition metal, such as $Li_xCoO_2$, $Li_xNiO_2$, $Li_xMn_2O_4$ and $LiFePO_4$, a metal chalcogen compound, such as $TiS_2$, $MoS_2$ and $NbSe_3$, and a conductive polymer compound, such as polyacene, poly-p-phenylene, polypyrrole and polyaniline. Among these, a composite oxide of at least one selected from transition metals including cobalt, nickel, manganese and the like with lithium, which is generally referred to as a high voltage system, is preferred since the releasing property of lithium ion and a high voltage may be easily obtained. Specific examples of the composite oxide of cobalt, nickel and manganese with lithium include $LiCoO_2$, $LiMnO_2$, $LiMn_2O_4$, $LiNiO_2$, $LiNi_xCo_{(1-x)}O_2$ and $LiMn_aNi_bCo_c$ (wherein a+b+c=1). Materials obtained by doping the lithium composite oxides with a small amount of an element, such as fluorine, boron, aluminum, chromium, zirconium, molybdenum and iron, and the lithium composite oxide in which the particles have a surface treated with carbon, $MgO$, $Al_2O_3$, $SiO_2$ or the like may be used. The positive electrode active substance may be used as a combination of two or more kinds thereof.

The negative electrode active substance used in the negative electrode of the invention may be any known active substance that is capable of performing occlusion and release of lithium ion without particular limitation. Examples thereof used include a carbon material, such as natural graphite, artificial graphite, non-graphitizable carbon and graphitizable carbon. Examples thereof used also include a metal material, such as metal lithium, an alloy and a tin compound, a lithium transition metal nitride, a crystalline metal oxide, an amorphous metal oxide, a silicon compound, and a conductive polymer, and specific examples thereof include $Li_4Ti_5O_{12}$ and $NiSi_5C_6$.

A conductive agent is used in the positive electrode and the negative electrode of the lithium secondary battery of the invention. Any electronic conductive material that does not adversely affect the battery capability may be used as the conductive agent without particular limitation. In general, carbon black, such as acetylene black and Ketjen black, is used, and such conductive materials may be used as natural graphite (e.g., squamous graphite, scaly graphite and earthy graphite), artificial graphite, carbon whiskers, carbon fibers, metal powder (e.g., copper, nickel, aluminum, silver and gold), metal fibers and a conductive ceramic material. These may be used as a mixture of two or more kinds thereof. The amount thereof added is preferably from 0.1 to 30% by mass, and particularly preferably from 0.2 to 20% by mass, based on the amount of the active substance.

As the collector for the electrode active substance of the lithium secondary battery of the invention, any electronic conductive material that does not adversely affect the battery thus fabricated may be used. Examples of the collector for the positive electrode include aluminum, titanium, stainless steel, nickel, sintered carbon, a conductive polymer and conductive glass, and also include a material containing aluminum, copper or the like having a surface treated with carbon, nickel, titanium, silver or the like for enhancing the adhesion property, the conductivity, and the oxidation resistance. Examples of the collector for the negative electrode include copper, stainless steel, nickel, aluminum, titanium, sintered carbon, a conductive polymer, conductive glass and an Al—Cd alloy, and also include a material containing copper or the like having a surface treated with carbon, nickel, titanium, silver or the like for enhancing the adhesion property, the conductivity, and the oxidation resistance. The surface of the material for the collector may be subjected to an oxidation treatment. Examples of the shape thereof include a foil form, and also include a film form, a sheet form, a net form, a punched or expanded member, a lath member, and a molded member, such as a porous member and a foamed member. The thickness thereof is not particularly limited, and may be generally from 1 to 100 µm.

The electrode of the lithium secondary battery of the invention may be produced in such a manner that the electrode active substance, a conductive agent, and a binder for binding the electrode active substance and the conductive agent to the collector, and the like are mixed to form an electrode material in a slurry form, which is coated on an aluminum foil, a copper foil or the like as a collector, followed by evaporating the dispersion medium.

The electrode material of the invention may contain a thickener, such as a water soluble polymer, as a viscosity controlling agent for forming the slurry. Specifically, one or more kinds selected from a cellulose compound, such as a carboxymethyl cellulose salt, methyl cellulose, ethyl cellulose, hydroxymethyl cellulose, hydroxypropyl methyl cellulose and hydroxyethyl methyl cellulose; a polycarboxylic acid compound, such as polyacrylic acid and sodium polyacrylate; a compound having a vinylpyrrolidone structure, such as polyvinylpyrrolidone; polyacrylamide, polyethylene oxide, polyvinyl alcohol, sodium alginate, xanthan gum, carrageenan, guar gum, agar, starch and the like may be used, and among these, a carboxymethyl cellulose salt is preferred.

The method, the order, and the like of mixing the electrode material are not particularly limited. For example, the active substance and the conductive agent may be mixed in advance to be used, and for mixing in this case, a mortar, a mill mixer, a ball mill, such as a planetary ball mill and a shaker ball mill, a mechano-fusion and the like may be used.

The separator used in the lithium secondary battery of the invention may be a separator that is used in an ordinary lithium secondary battery without particular limitation, and examples thereof include a porous resin formed of polyethylene, polypropylene, polyolefin, polytetrafluoroethylene or the like, ceramics, and nonwoven fabric.

The electrolytic solution used in the lithium secondary battery of the invention may be an electrolytic solution that is used in an ordinary lithium secondary battery, and ordinary materials, such as an organic electrolytic solution and an ionic liquid, may be used.

Examples of the electrolyte salt used in the lithium secondary battery of the invention include $LiPF_6$, $LiBF_4$, $LiClO_4$, $LiAsF_6$, $LiCl$, $LiBr$, $LiCF_3SO_3$, $LiN(CF_3SO_2)_2$, $LiC(CF_3SO_2)_3$, $LiI$, $LiAlCl_4$, $NaClO_4$, $NaBF_4$ and $NaI$, and particularly include an inorganic lithium salt, such as $LiPF_6$, $LiBF_4$, $LiClO_4$ and $LiAsF_6$, and an organic lithium salt represented by $LiN(SO_2C_xF_{2x+1})(SO_2C_yF_{2y+1})$, wherein x and y each represent an integer of 0 or from 1 to 4, provided that x+y is from 2 to 8. Specific examples of the organic lithium salt include $LiN(SO_2F)_2$, $LiN(SO_2CF_3)(SO_2C_2F_5)$, $LiN(SO_2CF_3)(SO_2C_3F_7)$, $LiN(SO_2CF_3)(SO_2C_4F_9)$, $LiN(SO_2C_2F_5)_2$, $LiN(SO_2C_2F_5)(SO_2C_3F_7)$ and $LiN(SO_2C_2F_5)(SO_2C_4F_9)$. Among these, the use of $LiPF_6$, $LiBF_4$, $LiN(CF_3SO_2)_2$, $LiN(SO_2F)_2$, $LiN(SO_2C_2F_5)_2$ or the like for the electrolyte is preferred since excellent electric characteristics may be provided. The electrolyte salts may be used solely or as a combination of two or more kinds thereof. The lithium salt is generally contained in the electrolytic solution in a concentration of from 0.1 to 2.0 mol/L, and preferably from 0.3 to 1.5 mol/L.

The organic solvent used for dissolving the electrolyte salt of the lithium secondary battery of the invention is not particularly limited as far as it is an organic solvent that is used for a non-aqueous electrolytic solution in an ordinary lithium secondary battery, and examples thereof include a carbonate compound, a lactone compound, an ether compound, a sulfolane compound, a dioxolane compound, a ketone compound, a nitrile compound and a halogenated hydrocarbon compound. Specific examples thereof include a carbonate compound, such as dimethyl carbonate, methyl ethyl carbonate, diethyl carbonate, ethylene carbonate, propylene carbonate, ethylene glycol dimethyl carbonate, propylene glycol dimethyl carbonate, ethylene glycol diethyl carbonate and vinylene carbonate, a lactone compound, such as γ-butyrolactone, an ether compound, such as dimethoxyethane, tetrahydrofuran, 2-methyltetrahydrofuran, tetrahydropyran and 1,4-dioxane, a sulfolane compound, such as sulfolane and 3-methylsulfolane, a dioxolane compound, such as 1,3-dioxolane, a ketone compound, such as 4-methyl-2-pentanone, a nitrile compound, such as acetonitrile, propionitrile, valeronitrile and benzonitrile, a halogenated hydrocarbon compound, such as 1,2-dichloroethane, and an ionic liquid of another compound such as methyl formate, dimethylformamide, diethylformamide, dimethylsulfoxide, an imidazolium salt and a quaternary ammonium salt. Mixtures of these compounds may also be used.

Among the organic solvents, at least one kind of a non-aqueous solvent selected from the group consisting of a carbonate compound is preferably contained for enhancing the solubility, the dielectric constant and the viscosity of the electrolyte.

In the case where a polymer electrolyte or a polymer gel electrolyte is used in the lithium secondary battery of the invention, examples thereof capable of being used include a polymer of ether, ester, siloxane, acrylonitrile, vinylidene fluoride, hexafluoropropylene, acrylate, methacrylate, styrene, vinyl acetate, vinyl chloride, oxetane and the like, a polymer having a copolymer structure thereof, and a cross-linked material thereof, which are polymer compounds, and the polymers may be used solely or as a combination of two or more kinds thereof. The polymer structure is not particularly limited, and a polymer having an ether structure, such as polyethylene oxide, is particularly preferred.

In the lithium secondary battery of the invention contains, an electrolytic solution, for a liquid battery; a precursor solution containing a polymer dissolved in an electrolytic solution, for a gel battery; or a pre-crosslinked polymer having an electrolyte salt dissolved therein, for a solid electrolyte battery, is housed in a battery container.

The lithium secondary battery of the invention may have a cylindrical shape, a coin shape, a rectangular shape or any arbitrary shape. The basic structure of the battery is the same regardless of the shape, and the design may be changed depending on the purpose. In the case of producing a cylindrical battery, for example, a negative electrode containing a negative electrode collector having coated thereon a negative electrode active substance and a positive electrode containing a positive electrode collector having coated thereon a positive electrode active substance are wound with a separator intervening therebetween to form a wound assembly, which is then housed in a battery canister, and a non-aqueous electrolytic solution is charged therein, followed by sealing the battery canister with insulating plates placed on the upper and bottom ends thereof. In the case of applying to a coin lithium secondary battery, a negative electrode in a disk shape, a separator, a positive electrode in a disk shape, and stainless steel plates are laminated and housed in a coin battery canister, and a non-aqueous electrolytic solution is charged therein, followed by sealing the battery canister.

EXAMPLE

Examples of the invention will be described along with comparative examples, but the invention is not limited thereto. In the following description, all "part" and "%" are based on mass unless otherwise indicated.

Synthesis of Polyurethane Water Dispersion 1

Synthesis Example 1-1

In a four-neck flask equipped with a stirrer, a reflux condenser, a thermometer and a nitrogen blowing tube, 100 parts by mass of Newpol BPE-20NK (an ethylene oxide adduct of bisphenol A, produced by Sanyo Chemical Industries, Ltd., average hydroxyl group value: 360 mgKOH/g, number of active hydrogen group: 2), 9.5 parts by mass of trimethylolpropane (number of active hydrogen group: 3), 16.3 parts by mass of dimethylolpropionic acid (number of active hydrogen group: 2), 174.2 parts by mass of dicyclohexylmethane diisocyanate, and 200 parts by mass of methyl ethyl ketone were placed, and reacted at 75° C. for 4 hours to provide a methyl ethyl ketone solution of a urethane prepolymer having a free isocyanate group content of 4.2% with respect to the nonvolatile component. The solution was cooled to 45° C. and neutralized by adding 12.3 parts by mass of triethylamine, and then the solution was emulsified and dispersed with a homogenizer while gradually adding 900 parts by mass water thereto. Subsequently, an amine aqueous solution containing 8.1 parts by mass of ethylenediamine (number of active hydrogen group: 2) diluted with 100 parts by mass of water was added thereto, and chain extending reaction was performed for 1 hour. The solvent was removed by heating to 50° C. under reduced pressure, thereby providing a polyurethane water dispersion 1A having a nonvolatile content of approximately 30%.

Synthesis Example 1-2

A polyurethane water dispersion 1B having a nonvolatile content of approximately 30% was produced in the same manner as in Synthesis Example 1-1 except that 100 parts by mass of Newpol BPE-20NK was changed to 145.2 parts by mass of Kuraray Polyol P-1020 (polyester polyol formed of 3-methyl-1,5-pentanediol and terephthalic acid, produced by Kuraray Co., Ltd., average hydroxyl group value: 110 mgKOH/g, number of active hydrogen group: 2), the amount of dicyclohexylmethane diisocyanate added was changed to 129.0 parts by mass, and the amount of ethylene diamine (number of active hydrogen group: 2) added was changed to 6.2 parts by mass.

Synthesis Example 1-3

A polyurethane water dispersion 1C having a nonvolatile content of approximately 30% was produced in the same manner as in Synthesis Example 1-1 except that 100 parts by mass of Newpol BPE-20NK was changed to 169.2 parts by mass of PCDL T-4671 (polycarbonate polyol formed of 1,4-butanediol and 1,6-hexanediol as constitutional components, produced by Asahi Kasei Chemicals Corporation, average hydroxyl group value: 110 mgKOH/g, number of active hydrogen group: 2), 174.2 parts by mass of dicyclohexylmethane diisocyanate was changed to 105 parts by mass of isophorone diisocyanate, and 8.1 parts by mass of ethylene diamine (number of active hydrogen group: 2) was changed to 4.4 parts by mass of diethylenetriamine (number of active hydrogen group: 3).

Synthesis Example 1-4

A polyurethane water dispersion 1D having a nonvolatile content of approximately 30% was produced in the same manner as in Synthesis Example 1-1 except that 100 parts by mass of Newpol BPE-20NK was changed to 145.2 parts by mass of PCDL T-4671 (number of active hydrogen group: 2), the amount of dicyclohexylmethane diisocyanate added was changed to 129 parts by mass, and the amount of ethylene diamine (number of active hydrogen group: 2) added was changed to 6.2 parts by mass.

Synthesis Example 1-5

A polyurethane water dispersion 1E having a nonvolatile content of approximately 30% was produced in the same manner as in Synthesis Example 1-4 except that the amount of PCDL T-4671 added was changed to 161.7 parts by mass, 129 parts by mass of dicyclohexylmethane diisocyanate was changed to 112.5 parts by mass of isophorone diisocyanate, and 6.2 parts by mass of ethylene diamine (number of active hydrogen group: 2) was changed to 14.0 parts by mass of m-xylenediamine (number of active hydrogen group: 2).

Synthesis Example 1-6

A polyurethane water dispersion 1F having a nonvolatile content of approximately 30% was produced in the same manner as in Synthesis Example 1-5 except that 14.0 parts by mass of m-xylenediamine (number of active hydrogen group: 2) was changed to 20.3 parts by mass of 4,4'-diaminodiphenylmethane (number of active hydrogen group: 2).

Synthesis Example 1-7

A polyurethane water dispersion 1G having a nonvolatile content of approximately 30% was produced in the same manner as in Synthesis Example 1-1 except that 100 parts by mass of Newpol BPE-20NK was changed to 141.9 parts by mass of Eternacoll UM-90 (1/3) (a polycarbonate polyol formed of 1,6-hexanediol and 1,4-cyclohexanedimethanol as constitutional components, produced by Ube Industries, Ltd., average hydroxyl group value: 125 mgKOH/g, number of active hydrogen group: 2), the amount of dicyclohexylmethane diisocyanate added was changed to 132.3 parts by mass, and the amount of ethylene diamine (number of active hydrogen group: 2) added was changed to 6.2 parts by mass.

Synthesis Example 1-8

A polyurethane water dispersion 1H having a nonvolatile content of approximately 30% was produced in the same manner as in Synthesis Example 1-1 except that 100 parts by mass of Newpol BPE-20NK was changed to 145.2 parts by mass of Kuraray Polyol C-1065N (polycarbonate polyol formed of 1,9-nonanediol and 2-methyl-1,8-octanediol as constitutional components, produced by Kuraray Co., Ltd., average hydroxyl group value: 110 mgKOH/g, number of active hydrogen group: 2), the amount of dicyclohexylmethane diisocyanate added was changed to 129 parts by mass, and 8.1 parts by mass of ethylene diamine (number of active hydrogen group: 2) was changed to 18.0 parts by mass of isophorone diamine (number of active hydrogen group: 2).

Synthesis Example 1-9

A polyurethane water dispersion 1I having a nonvolatile content of approximately 30% was produced in the same manner as in Synthesis Example 1-4 except that the amount of triethylamine added was changed to 4.9 parts by mass.

Synthesis Example 1-10

A polyurethane water dispersion 1J having a nonvolatile content of approximately 30% was produced in the same manner as in Synthesis Example 1-9 except that the amount of PCDL T-4671 (number of active hydrogen group: 2) added was changed to 127 parts by mass, the amount of dimethylolpropionic acid (number of active hydrogen group: 2) added was changed to 24 parts by mass, the amount of dicyclohexylmethane diisocyanate added was changed to 139.5 parts by mass, and the amount of triethylamine added was changed to 18.1 parts by mass.

Synthesis Example 1-11

A polyurethane water dispersion 1K having a nonvolatile content of approximately 30% was produced in the same manner as in Synthesis Example 1-9 except that the amount of PCDL T-4671 (number of active hydrogen group: 2) added was changed to 187.2 parts by mass, 129 parts by mass of dicyclohexylmethane diisocyanate was changed to 87 parts by mass tolylene diisocyanate, and the chain extension reaction with ethylenediamine was changed to chain extension reaction with water (number of active hydrogen group: 2).

Synthesis Example 1-12

In a four-neck flask equipped with a stirrer, a reflux condenser, a thermometer and a nitrogen blowing tube, 147.0 parts by mass of Kuraray Polyol P-1020 (number of active hydrogen group: 2), 9.5 parts by mass of trimethylolpropane (number of active hydrogen group: 3), 14.5 parts by mass of N-methyldiethanolamine (number of active hydrogen group: 2), 129.0 parts by mass of dicyclohexylmethane diisocyanate, and 200 parts by mass of methyl ethyl ketone were placed, and reacted at 75° C. for 4 hours to provide a methyl ethyl ketone solution of a urethane prepolymer having a free isocyanate group content of 3.2% with respect to the nonvolatile component.

The solution was then cooled to 45° C. and quaternarized by adding 15.3 parts by mass of dimethyl sulfate, and then the solution was emulsified and dispersed with a homogenizer while gradually adding 900 parts by mass of water thereto, thereby performing chain extending reaction with water (number of active hydrogen group: 2) for 1 hour. The solvent was removed by heating to 50° C. under reduced pressure, thereby providing a polyurethane water dispersion 1L having a nonvolatile content of approximately 30%.

Synthesis Example 1-13

A polyurethane water dispersion 1M having a nonvolatile content of approximately 30% was produced in the same manner as in Synthesis Example 1-12 except that 147.0 parts by mass of Kuraray Polyol P-1020 was changed to 147.0 parts by mass of PCDL T-4671 (number of active hydrogen group: 2), and the chain extension reaction with water (number of active hydrogen group: 2) was changed to chain extension reaction with 6.2 parts by mass of ethylenediamine (number of active hydrogen group: 2).

Synthesis Example 1-14

In a four-neck flask equipped with a stirrer, a reflux condenser, a thermometer and a nitrogen blowing tube, 206.2 parts by mass of Poly THF1000 (polytetramethylene ether glycol, produced by BASF AG, average hydroxyl group value: 110 mgKOH/g, number of active hydrogen group: 2), 5.5 parts by mass of 1,4-cyclohexanedimethanol (number of active hydrogen group: 2), 16.3 parts by mass of dimethylolpropionic acid (number of active hydrogen group: 2), 72 parts by mass of hexamethylene diisocyanate, and 200 parts by mass of methyl ethyl ketone were placed, and reacted at 75° C. for 4 hours to provide a methyl ethyl ketone solution of a urethane prepolymer having a free isocyanate group content of 1.6% with respect to the nonvolatile component. The solution was cooled to 45° C. and neutralized by adding 12.3 parts by mass of triethylamine, and then the solution was emulsified and dispersed with a homogenizer while gradually adding 900 parts by mass of water thereto. Subsequently, chain extending reaction was performed with water (number of active hydrogen group: 2) for 1 hour. The solvent was removed by heating to 50° C. under reduced pressure, thereby providing a polyurethane water dispersion 1N having a nonvolatile content of approximately 30%.

Synthesis Example 1-15

A polyurethane water dispersion 1O having a nonvolatile content of approximately 30% was produced in the same manner as in Synthesis Example 1-14 except that 206.2 parts by mass of Poly THF 1000 was changed to 181.7 parts by mass of Kuraray Polyol P-1010 (polyester polyol formed of 3-methyl-1,5-pentanediol and adipic acid, produced by Kuraray Co., Ltd., average hydroxyl group value: 110 mgKOH/g, number of active hydrogen group: 2), 5.5 parts by mass of 1,4-cyclohexanedimethanol was changed to 9.5 parts by mass of trimethylolpropane (number of active hydrogen group: 3), the amount of hexamethylene diisocyanate was changed to 92.5 parts by mass, and the chain extension reaction with water was changed to a chain extending reaction with 7.8 parts by mass of diethylenetriamine (number of active hydrogen group: 3).

Synthesis Example 1-16

A polyurethane water dispersion 1P having a nonvolatile content of approximately 30% was produced in the same manner as in Synthesis Example 1-15 except that the amount of Kuraray Polyol P-1010 added was changed to 212.9 parts by mass, the amount of trimethylolpropane added was changed to 0.3 part by mass, the amount of hexamethylene diisocyanate added was changed to 70.5 parts by mass, and the chain extension reaction with diethylenetriamine was changed to a chain extension reaction with water.

Evaluation of Polyurethane Water Dispersion

The free isocyanate group contents with respect to the nonvolatile component of the methyl ethyl ketone solutions of the urethane prepolymers thus synthesized in the synthesis examples are shown in Table 1 below.

The mass of the nonvolatile content of the polyurethane water dispersion thus obtained was measured according to JIS K6828. The polyurethane water dispersions were subjected to the following measurements. The results are shown in Table 1.

The crosslinking density of the resin solid content of the polyurethane water dispersion was calculated by the expression 1 shown above.

The acid value, the amine value, the amount of urethane bond, and the amount of urea bond of the polyurethane were calculated from the charged amounts in the synthesis of the urethane resin and the free isocyanate group content with respect to the nonvolatile content after the reaction.

The total content of the aromatic ring and the alicyclic ring in the polyurethane was calculated from the charged amounts in the synthesis of the urethane resin and the charged amount of the amine chain extending agent.

The average particle diameter of the polyurethane water dispersion was measured with Microtrac UPA-UZ152 (produced by Nikkiso Co., Ltd.), and the 50% average value was designated as the average particle diameter.

TABLE 1

| Polyurethane water dispersion | Free isocyanate group content (%) | Crosslinking density | Average particle diameter (μm) | Acid value or amine value (mgKOH/g) | Amount of urethane bond (g/eq) | Amount of urea bond (g/eq) | Content of aromatic ring or alicyclic ring (wt %) |
|---|---|---|---|---|---|---|---|
| 1A | 4.2 | 0.23 | 0.02 | 23 | 291 | 1,062 | 48 |
| 1B | 3.3 | 0.23 | 0.02 | 23 | 398 | 1,372 | 40 |
| 1C | 2.0 | 0.38 | 0.02 | 23 | 373 | 2,221 | 13 |
| 1D | 3.3 | 0.23 | 0.02 | 23 | 398 | 1,372 | 26 |

TABLE 1-continued

| Polyurethane water dispersion | Free isocyanate group content (%) | Crosslinking density | Average particle diameter (μm) | Acid value or amine value (mgKOH/g) | Amount of urethane bond (g/eq) | Amount of urea bond (g/eq) | Content of aromatic ring or alicyclic ring (wt %) |
|---|---|---|---|---|---|---|---|
| 1E | 3.2 | 0.23 | 0.02 | 23 | 381 | 1,404 | 19 |
| 1F | 3.2 | 0.23 | 0.02 | 23 | 381 | 1,404 | 25 |
| 1G | 3.3 | 0.23 | 0.02 | 23 | 385 | 1,371 | 31 |
| 1H | 3.3 | 0.23 | 0.02 | 23 | 398 | 1,372 | 31 |
| 1I | 3.3 | 0.23 | 0.45 | 23 | 398 | 1,372 | 26 |
| 1J | 3.3 | 0.23 | 0.01 | 23 | 398 | 1,372 | 28 |
| 1K | 2.3 | 0.23 | 0.02 | 23 | 357 | 3,739 | 17 |
| 1L | 3.2 | 0.23 | 0.02 | 23 | 396 | 1,470 | 40 |
| 1M | 3.2 | 0.23 | 0.02 | 23 | 396 | 2,646 | 26 |
| 1N | 1.6 | 0 | 0.02 | 23 | 403 | 5,296 | 0 |
| 1O | 3.8 | 0.92 | 0.02 | 23 | 362 | 1,162 | 0 |
| 1P | 2.2 | 0.007 | 0.02 | 23 | 436 | 3,955 | 0 |

Production of Electrodes

Negative electrodes and positive electrodes were produced in the following manner by using the polyurethane water dispersions shown in Table 2 below as a binder.

TABLE 2

| Kind of electrode | Kind of binder |
|---|---|
| negative electrode 1-1 | polyurethane water dispersion 1A |
| negative electrode 1-2 | polyurethane water dispersion 1B |
| negative electrode 1-3 | polyurethane water dispersion 1C |
| negative electrode 1-4 | polyurethane water dispersion 1D |
| negative electrode 1-5 | polyurethane water dispersion 1E |
| negative electrode 1-6 | polyurethane water dispersion 1F |
| negative electrode 1-7 | polyurethane water dispersion 1G |
| negative electrode 1-8 | polyurethane water dispersion 1H |
| negative electrode 1-9 | polyurethane water dispersion 1I |
| negative electrode 1-10 | polyurethane water dispersion 1J |
| negative electrode 1-11 | polyurethane water dispersion 1K |
| negative electrode 1-12 | polyurethane water dispersion 1L |
| negative electrode 1-13 | polyurethane water dispersion 1M |
| negative electrode 1-14 | polyurethane water dispersion 1N |
| negative electrode 1-15 | polyurethane water dispersion 1O |
| negative electrode 1-16 | polyurethane water dispersion 1P |
| negative electrode 1-17 | SBR |
| negative electrode 1-18 | polyurethane water dispersion 1A |
| negative electrode 1-19 | SBR |
| negative electrode 1-20 | polyurethane water dispersion 1H |
| negative electrode 1-21 | SBR |
| negative electrode 1-22 | polyurethane water dispersion 1I + crosslinking agent |
| positive electrode 1-1 | polyvinylidene fluoride |
| positive electrode 1-2 | polyurethane water dispersion 1A |
| positive electrode 1-3 | polyurethane water dispersion 1Q |
| positive electrode 1-4 | polyvinylidene fluoride |
| positive electrode 1-5 | polyurethane water dispersion 1H |
| positive electrode 1-6 | polyvinylidene fluoride |
| positive electrode 1-7 | polyurethane water dispersion 1I |

Negative Electrode 1-1

With a planetary mixer, 100 g of natural graphite as a negative electrode active substance, 0.5 g of carbon black (Super-P, produced by Timcal Graphite & Carbon) as a conductive agent, 100 g of a 2% by mass aqueous solution of carboxymethyl cellulose (CMC) (Cellogen WS-C, produced by Dai-ichi Kogyo Seiyaku Co., Ltd.) as a thickener, and 6.7 g of a 30% by mass solution of the polyurethane water dispersion 1A as a binder were mixed to prepare a negative electrode slurry having a solid content of 50%. The negative electrode slurry was coated on an electrolytic copper foil having a thickness of 10 μm with a coating machine, dried at 120° C., and then subjected to a roll pressing treatment, thereby providing a negative electrode 1-1 having a negative electrode active substance in an amount of 7 mg/cm².

Negative Electrodes 1-2 to 1-11 and 1-14 to 1-17

Negative electrodes were produced in the same manner as in the negative electrode 1-1 except that the polyurethane water dispersion 1 A was changed to the polyurethane water dispersions or a styrene-butadiene rubber (SBR) latex shown in Table 2.

Negative Electrodes 1-12 and 1-13

With a planetary mixer, 100 g of natural graphite as a negative electrode active substance, 0.5 g of carbon black (Super-P, produced by Timcal Graphite & Carbon) as a conductive agent, 100 g of a 1% by mass aqueous solution of hydroxyethyl cellulose (HEC) (HEC Daicel SP900, produced by Daicel Chemical Industries, Ltd.) as a thickener, and 6.7 g of a 30% by mass solution of the polyurethane water dispersion shown in Table 2 as a binder were mixed to prepare a negative electrode slurry having a solid content of 50%. The negative electrode slurry was coated on an electrolytic copper foil having a thickness of 10 μm with a coating machine, dried at 120° C., and then subjected to a roll pressing treatment, thereby providing a negative electrode having a negative electrode active substance in an amount of 7 mg/cm².

Negative Electrode 1-18

With a planetary mixer, 100 g of SiO (average particle diameter: 4.5 μm, specific surface area: 5.5 m²/g) as a negative electrode active substance, 5 g of carbon black (Super-P, produced by Timcal Graphite & Carbon) as a conductive agent, 100 g of a 2% by mass aqueous solution of carboxymethyl cellulose (CMC) (Cellogen WS-C, produced by Dai-ichi Kogyo Seiyaku Co., Ltd.) as a thickener, and 6.7 g of a 30% by mass solution of the polyurethane water dispersion 1A as a binder were mixed to prepare a negative electrode slurry having a solid content of 50%. The negative electrode slurry was coated on an electrolytic copper foil having a thickness of 10 μm with a coating machine, dried at 120° C., and then subjected to a roll pressing treatment, thereby providing a negative electrode having a negative electrode active substance in an amount of 2.5 mg/cm².

Negative Electrode 1-19

A negative electrode was produced in the same manner as in the negative electrode 1-18 except that the polyurethane water dispersion 1A was changed to an SBR latex.

Negative Electrode 1-20

With a planetary mixer, 100 g of $Li_4Ti_5O_{12}$ as a negative electrode active substance, 5 g of carbon black (Super-P, produced by Timcal Graphite & Carbon) as a conductive agent, 100 g of a 2% by mass aqueous solution of carboxymethyl cellulose (CMC) (Cellogen WS-C, produced by Dai-ichi Kogyo Seiyaku Co., Ltd.) as a thickener, and 6.7 g of a 30% by mass solution of the polyurethane water dispersion 1H as a binder were mixed to prepare a negative electrode slurry having a solid content of 50%. The negative electrode slurry was coated on an electrolytic copper foil having a thickness of 10 μm with a coating machine, dried at 120° C., and then subjected to a roll pressing treatment, thereby providing a negative electrode having a negative electrode active substance in an amount of 9.7 mg/cm$^2$.

Negative Electrode 1-21

A negative electrode was produced in the same manner as in the negative electrode 1-20 except that the polyurethane water dispersion 1H was changed to an SBR latex.

Negative Electrode 1-22

With a planetary mixer, 100 g of natural graphite as a negative electrode active substance, 0.5 g of carbon black (Super-P, produced by Timcal Graphite & Carbon) as a conductive agent, 100 g of a 2% by mass aqueous solution of carboxymethyl cellulose (CMC) (Cellogen WS-C, produced by Dai-ichi Kogyo Seiyaku Co., Ltd.) as a thickener, and 6.7 g of a 30% by mass solution of the polyurethane water dispersion 1I as a binder were mixed, and then 0.1 g of a polyisocyanate crosslinking agent (Aquanate AQ-210, produced by Nippon Polyurethane Industry Co., Ltd.) as a crosslinking agent was added and mixed therewith to prepare a negative electrode slurry having a solid content of 50%. The negative electrode slurry was coated on an electrolytic copper foil having a thickness of 10 μm with a coating machine, dried at 120° C., and then subjected to a roll pressing treatment, thereby providing a negative electrode having a negative electrode active substance in an amount of 7 mg/cm$^2$.

Positive Electrode 1-1

With a planetary mixer, 100 g of $LiNi_{1/3}Co_{1/3}Mn_{1/3}O_2$ as a positive electrode active substance, 7.8 g of carbon black (Super-P, produced by Timcal Graphite & Carbon) as a conductive agent, 6 g of polyvinylidene fluoride (PVDF) as a binder, and 61.3 g of N-methyl-2-pyrrolidone as a dispersion medium were mixed to prepare a positive electrode slurry having a solid content of 65%. The positive electrode slurry was coated on an aluminum foil having a thickness of 20 μm with a coating machine, dried at 130° C., and then subjected to a roll pressing treatment, thereby providing a positive electrode having a positive electrode active substance in an amount of 13.8 mg/cm$^2$.

Positive Electrodes 1-2 and 1-3

With a planetary mixer, 100 g of $LiNi_{1/3}Co_{1/3}Mn_{1/3}O_2$ as a positive electrode active substance, 7.8 g of carbon black (Super-P, produced by Timcal Graphite & Carbon) as a conductive agent, 100 g of a 2% by mass aqueous solution of carboxymethyl cellulose (Cellogen WS-C, produced by Dai-ichi Kogyo Seiyaku Co., Ltd.) as a thickener, and 6.7 g of a 30% by mass solution of the polyurethane water dispersion shown in Table 2 as a binder were mixed to prepare a positive electrode slurry having a solid content of 50%. The positive electrode slurry was coated on an aluminum foil having a thickness of 20 μm with a coating machine, dried at 130° C., and then subjected to a roll pressing treatment, thereby providing a positive electrode having a positive electrode active substance in an amount of 13.8 mg/cm$^2$.

Positive Electrode 1-4

With a planetary mixer, 100 g of $LiMn_2O_4$ as a positive electrode active substance, 5 g of carbon black (Super-P, produced by Timcal Graphite & Carbon) as a conductive agent, 6 g of polyvinylidene fluoride as a binder, and 59.8 g of N-methyl-2-pyrrolidone as a dispersion medium were mixed to prepare a positive electrode slurry having a solid content of 65%. The positive electrode slurry was coated on an aluminum foil having a thickness of 20 μm with a coating machine, dried at 130° C., and then subjected to a roll pressing treatment, thereby providing a positive electrode having a positive electrode active substance in an amount of 22 mg/cm$^2$.

Positive Electrode 1-5

With a planetary mixer, 100 g of $LiMn_2O_4$ as a positive electrode active substance, 5 g of carbon black (Super-P, produced by Timcal Graphite & Carbon) as a conductive agent, 100 g of a 2% by mass aqueous solution of carboxymethyl cellulose (Cellogen WS-C, produced by Dai-ichi Kogyo Seiyaku Co., Ltd.) as a thickener, and 6.7 g of a 30% by mass solution of the polyurethane water dispersion 1G as a binder were mixed to prepare a positive electrode slurry having a solid content of 50%. The positive electrode slurry was coated on an aluminum foil having a thickness of 20 μm with a coating machine, dried at 130° C., and then subjected to a roll pressing treatment, thereby providing a positive electrode having a positive electrode active substance in an amount of 22 mg/cm$^2$.

Positive Electrode 1-6

With a planetary mixer, 100 g of $LiFeOP_4$ as a positive electrode active substance, 5 g of carbon black (Super-P, produced by Timcal Graphite & Carbon) as a conductive agent, 6 g of polyvinylidene fluoride as a binder, and 135.7 g of N-methyl-2-pyrrolidone as a dispersion medium were mixed to prepare a positive electrode slurry having a solid content of 45%. The positive electrode slurry was coated on an aluminum foil having a thickness of 20 μm with a coating machine, dried at 130° C., and then subjected to a roll pressing treatment, thereby providing a positive electrode having a positive electrode active substance in an amount of 14.5 mg/cm$^2$.

Positive Electrode 1-7

With a planetary mixer, 100 g of $LiFeOP_4$ as a positive electrode active substance, 5 g of carbon black (Super-P, produced by Timcal Graphite & Carbon) as a conductive agent, 100 g of a 2% by mass aqueous solution of carboxymethyl cellulose (Cellogen WS-C, produced by Dai-ichi Kogyo Seiyaku Co., Ltd.) as a thickener, and 6.7 g of a 30% by mass solution of the polyurethane water dispersion 1H as a binder were mixed to prepare a positive electrode slurry having a solid content of 50%. The positive electrode slurry was coated on an aluminum foil having a thickness of 20 μm with a coating machine, dried at 130° C., and then subjected to a roll pressing treatment, thereby providing a positive electrode having a positive electrode active substance in an amount of 14.5 mg/cm$^2$.

Evaluation of Electrode

The electrodes thus obtained were subjected to the following evaluation. The evaluation results are shown in Table 3.

Evaluation of Binding Capability

The electrode thus obtained was folded by 180° with the coated surface directed outward and unfolded, and then the extent of drop-off of the active substance on the coated surface (the proportion of the drop-off area with respect to the total area) was visually determined and evaluated according to the following standard.

5: 0% drop-off
4: 25% drop-off
3: 50% drop-off
2: 75% drop-off
1: 100% drop-off

Evaluation of Resistance to Electrolytic Solution

The electrode thus obtained was immersed in a mixed solvent containing EC (ethylene carbonate)/PC (propylene carbonate)/DMC (dimethyl carbonate)/EMC (ethylmethyl carbonate)/DEC (diethyl carbonate)=1/1/1/1/1 (by volume) at a liquid temperature of 60° C. for 7 days, and then the appearance of the coated film was visually observed and evaluated according to the following standard.
A: no change found on coated film
B: several blisters formed on coated film
C: drop-off of coated film found

TABLE 3

| | Kind of electrode | Evaluation of binding capability | Evaluation of resistance to electrolytic solution |
|---|---|---|---|
| Example 1-1 | negative electrode 1-1 | 4 | A |
| Example 1-2 | negative electrode 1-2 | 4 | A |
| Example 1-3 | negative electrode 1-3 | 4 | A |
| Example 1-4 | negative electrode 1-4 | 5 | A |
| Example 1-5 | negative electrode 1-5 | 4 | A |
| Example 1-6 | negative electrode 1-6 | 5 | A |
| Example 1-7 | negative electrode 1-7 | 4 | A |
| Example 1-8 | negative electrode 1-8 | 5 | A |
| Example 1-9 | negative electrode 1-9 | 5 | A |
| Example 1-10 | negative electrode 1-10 | 5 | A |
| Example 1-11 | negative electrode 1-11 | 4 | A |
| Example 1-12 | negative electrode 1-12 | 4 | A |
| Example 1-13 | negative electrode 1-13 | 5 | A |
| Example 1-14 | negative electrode 1-18 | 4 | A |
| Example 1-15 | negative electrode 1-20 | 5 | A |
| Example 1-16 | negative electrode 1-22 | 5 | A |
| Example 1-17 | positive electrode 1-2 | 4 | A |
| Example 1-18 | positive electrode 1-5 | 5 | A |
| Example 1-19 | positive electrode 1-7 | 5 | A |
| Comparative Example 1-1 | negative electrode 1-17 | 3 | A |
| Comparative Example 1-2 | negative electrode 1-19 | 3 | A |
| Comparative Example 1-3 | negative electrode 1-21 | 3 | A |
| Comparative Example 1-4 | positive electrode 1-1 | 3 | A |
| Comparative Example 1-5 | positive electrode 1-4 | 3 | A |
| Comparative Example 1-6 | positive electrode 1-6 | 3 | A |

Production of Lithium Secondary Battery

The negative electrode and the positive electrode thus obtained were combined as shown in Table 4 below and laminated on each other with a polyolefin (PE/PP) separator as a separator intervening between the electrodes, and a positive electrode terminal and a negative electrode terminal were ultrasonic-welded to the positive and negative electrodes respectively. The laminate was placed in an aluminum-laminated package, which was heat-sealed except for an opening for injecting a liquid, thereby producing a battery without a liquid injected having a positive electrode area of 18 cm$^2$ and a negative electrode area of 19.8 cm$^2$. In a solvent obtained by mixing ethylene carbonate and diethyl carbonate (30/70 in volume), LiPF$_6$ (1.0 mol/L) was dissolved to prepare an electrolytic solution, which was then charged in the battery, and the opening was heat-sealed, thereby providing a battery for evaluation.

TABLE 4

| | Constitution of electrodes | |
|---|---|---|
| | Negative electrode | Positive electrode |
| Example 1-20 | negative electrode 1-1 | positive electrode 1-1 |
| Example 1-21 | negative electrode 1-2 | positive electrode 1-1 |
| Example 1-22 | negative electrode 1-3 | positive electrode 1-1 |
| Example 1-23 | negative electrode 1-4 | positive electrode 1-1 |
| Example 1-24 | negative electrode 1-5 | positive electrode 1-1 |
| Example 1-25 | negative electrode 1-6 | positive electrode 1-1 |
| Example 1-26 | negative electrode 1-7 | positive electrode 1-1 |
| Example 1-27 | negative electrode 1-8 | positive electrode 1-1 |
| Example 1-28 | negative electrode 1-9 | positive electrode 1-1 |
| Example 1-29 | negative electrode 1-10 | positive electrode 1-1 |
| Example 1-30 | negative electrode 1-11 | positive electrode 1-1 |
| Example 1-31 | negative electrode 1-12 | positive electrode 1-1 |
| Example 1-32 | negative electrode 1-13 | positive electrode 1-1 |
| Example 1-33 | negative electrode 1-18 | positive electrode 1-1 |
| Example 1-34 | negative electrode 1-20 | positive electrode 1-1 |
| Example 1-35 | negative electrode 1-22 | positive electrode 1-1 |
| Example 1-36 | negative electrode 1-17 | positive electrode 1-2 |
| Example 1-37 | negative electrode 1-17 | positive electrode 1-5 |
| Example 1-38 | negative electrode 1-17 | positive electrode 1-7 |
| Example 1-39 | negative electrode 1-7 | positive electrode 1-2 |
| Comparative Example 1-7 | negative electrode 1-17 | positive electrode 1-1 |
| Comparative Example 1-8 | negative electrode 1-19 | positive electrode 1-1 |
| Comparative Example 1-9 | negative electrode 1-21 | positive electrode 1-1 |
| Comparative Example 1-10 | negative electrode 1-17 | positive electrode 1-3 |
| Comparative Example 1-11 | negative electrode 1-17 | positive electrode 1-4 |
| Comparative Example 1-12 | negative electrode 1-17 | positive electrode 1-6 |

Evaluation of Battery Capability

The lithium secondary batteries thus produced above were subjected to a capability test at 20° C. The test method was as follows. The test results are shown in Table 5.

Cell Impedance

For the cell impedance, a resistance value at a frequency of 1 kHz was measured with an impedance analyzer (produced by ZAHNER-Elektrik GmbH & CoKG).

Charge and Discharge Cycle Characteristics

The charge and discharge cycle characteristics were measured under the following condition.

In the case where LiNi$_{1/3}$Co$_{1/3}$Mn$_{1/3}$O$_2$ or LiMn$_2$O$_4$ was used as the positive electrode active substance, and natural graphite was used as the negative electrode active substance, a cycle, in which the battery was charged at constant current (CC) and a current density corresponding to 1 C until 4.2 V, charged for 1.5 hours after switching to constant voltage (CV) charging at 4.2 V, and then discharged at CC and a current density corresponding to 1 C until 2.7 V, was performed for 300 cycles at 20° C., and the ratio of the 1 C discharge capacity after the 300 cycles with respect to the initial 1 C discharge capacity was designated as a 1 C charge and discharge cycle retention.

In the case where LiFeOP$_4$ was used as the positive electrode active substance, and natural graphite was used as the negative electrode active substance, a cycle, in which the battery was charged at constant current (CC) and a current density corresponding to 1 C until 4.0 V, charged for 1.5 hours after switching to constant voltage (CV) charging at 4.0 V, and then discharged at CC and a current density corresponding to 1 C until 2.0 V, was performed for 300 cycles at 20° C., and the ratio of the 1 C discharge capacity after the 300 cycles with respect to the initial 1 C discharge capacity was designated as a 1 C charge and discharge cycle retention. In the case where $LiNi_{1/3}Co_{1/3}Mn_{1/3}O_2$ was used as the positive electrode active substance, and $Li_4Ti_5O_{12}$ was used as the negative electrode active substance, a cycle, in which the battery was charged at constant current (CC) and a current density corresponding to 1 C until 2.9 V, charged for 1.5 hours after switching to constant voltage (CV) charging at 2.9 V, and then discharged at CC and a current density corresponding to 1 C until 1.0 V, was performed for 300 cycles at 20° C., and the ratio of the 1 C discharge capacity after the 300 cycles with respect to the initial 1 C discharge capacity was designated as a 1 C charge and discharge cycle retention.

In the case where $LiNi_{1/3}Co_{1/3}Mn_{1/3}O_2$ was used as the positive electrode active substance, and SiO was used as the negative electrode active substance, a cycle, in which the battery was charged at constant current (CC) and a current density corresponding to 1 C until 4.2 V, charged for 1.5 hours after switching to constant voltage (CV) charging at 4.2 V, and then discharged at CC and a current density corresponding to 1 C until 2.7 V, was performed for 50 cycles at 20° C., and the ratio of the 1 C discharge capacity after the 50 cycles with respect to the initial 1 C discharge capacity was designated as a 1 C charge and discharge cycle retention.

TABLE 5

| | Evaluation of battery | |
|---|---|---|
| | Cell impedance (mΩ/1 kHz) | Capacity retention after charge and discharge cycles (%) |
| Example 1-20 | 183 | 97.2 |
| Example 1-21 | 197 | 95.3 |
| Example 1-22 | 201 | 94.5 |
| Example 1-23 | 190 | 96.3 |
| Example 1-24 | 200 | 95.4 |
| Example 1-25 | 202 | 95.0 |
| Example 1-26 | 185 | 97.0 |
| Example 1-27 | 187 | 96.7 |
| Example 1-28 | 188 | 96.5 |
| Example 1-29 | 196 | 96.0 |
| Example 1-30 | 202 | 95.0 |
| Example 1-31 | 204 | 94.6 |
| Example 1-32 | 201 | 94.8 |
| Example 1-33 | 205 | 94.3 |
| Example 1-34 | 185 | 97.3 |
| Example 1-35 | 194 | 95.7 |
| Example 1-36 | 198 | 95.3 |
| Example 1-37 | 200 | 95.1 |
| Example 1-38 | 182 | 97.5 |
| Example 1-39 | 187 | 97.1 |
| Comparative Example 1-7 | 230 | 91.1 |
| Comparative Example 1-8 | 248 | 87.2 |
| Comparative Example 1-9 | 220 | 92.5 |
| Comparative Example 1-10 | 290 | 75.8 |
| Comparative Example 1-11 | 236 | 90.3 |
| Comparative Example 1-12 | 225 | 91.8 |

It is understood from Table 5 that as compared to the use of styrene-butadiene rubber or polyvinylidene fluoride having been used, the use of the polyurethane water dispersion of the invention provides more excellent binding capability, a lower cell impedance, and a higher capacity retention after the charge and discharge cycles.

Synthesis of Polyurethane Water Dispersion 2

Synthesis Example 2-1

While bubbling nitrogen gas in a reaction vessel equipped with a thermometer, a nitrogen gas introducing tube and a stirrer, 220 parts by mass of adipic acid, 180 parts by mass of 3-methyl-1,5-pentanediol and 0.1 part of tetrabutyl titanate were charged therein, and reaction was performed at a reaction temperature controlled to from 160 to 170° C. to make an overhead temperature of from 50 to 60° C. until the acid value reached 0.3 mgKOH/g or lower. The reaction was then performed at 180° C. under a reduced pressure condition of 5 kPa·abs or lower for 2 hours, thereby providing a polyester polyol having a hydroxyl group value of 112 mgKOH/g and an acid value of 0.2 mgKOH/g. In the reaction vessel, furthermore, 53.4 parts of dimethyl isophthalate 5-sodium sulfonate (DMIS) and 0.8 part of tetrabutyl titanate were charged, and reaction was performed at a reaction temperature controlled to from 170 to 180° C. to make an overhead temperature of from 50 to 70° C., thereby providing a sulfonic acid-containing polyester polyol (a-1) having a hydroxyl group value of 53 mgKOH/g, an acid value of 0.3 mgKOH/g and a number of active hydrogen group of 2.

The resulting polyol was measured for an acid value according to JIS K1557 and for an average hydroxyl group value according to JIS K1557.

In a four-neck flask equipped with a stirrer, a reflux condenser, a thermometer and a nitrogen blowing tube, 184.2 parts by mass of the polyester polyol (a-1) (number of active hydrogen group: 2), 9.5 parts by mass of trimethylolpropane (number of active hydrogen group: 3), 16.3 parts by mass of 1,4-cyclohexanedimethanol (number of active hydrogen group: 2), 90 parts by mass of isophorone diisocyanate, and 200 parts by mass of methyl ethyl ketone were placed, and reacted at 75° C. for 4 hours to provide a methyl ethyl ketone solution of a urethane prepolymer having a free isocyanate group content of 2.7% with respect to the nonvolatile component. The solution was cooled to 45° C. and emulsified and dispersed with a homogenizer while gradually adding 900 parts by mass of water thereto. Subsequently, an amine aqueous solution containing 5.2 parts by mass of ethylenediamine (number of active hydrogen group: 2) diluted with 100 parts by mass of water was added thereto, and chain extending reaction was performed for 1 hour. The solvent was removed by heating to 50° C. under reduced pressure, thereby providing a polyurethane water dispersion 2A having a nonvolatile content of approximately 30%.

Synthesis Example 2-2

In a four-neck flask equipped with a stirrer, a reflux condenser, a thermometer and a nitrogen blowing tube, 145 parts by mass of Newpol BPE-20NK (an ethylene oxide adduct of bisphenol A, produced by Sanyo Chemical Industries, Ltd., average hydroxyl group value: 360 mgKOH/g, number of active hydrogen group: 2), 9.5 parts by mass of trimethylolpropane (number of active hydrogen group: 3), 16.3 parts by mass of dimethylolpropionic acid (number of active hydrogen group: 2), 129.2 parts by mass of hexamethylene diisocyanate, and 200 parts by mass of methyl ethyl ketone were placed, and reacted at 75° C. for 4 hours to provide a methyl ethyl ketone solution of a urethane prepolymer having a free isocyanate group content of 3.5% with respect to the nonvolatile component. The solution was cooled to 45° C. and neutralized by adding 12.3 parts by mass of triethylamine, and then the solution was emulsified and dispersed with a homogenizer while gradually adding 900 parts by mass of water thereto. Subsequently, an amine aqueous solution containing 6.8 parts by mass of ethylenediamine (number of active hydrogen group: 2) diluted with 100 parts by mass of water was added thereto, and chain extending reaction was performed for 1 hour. The solvent was removed by heating to 50° C. under reduced pressure, thereby providing a polyurethane water dispersion 2B having a nonvolatile content of approximately 30%.

Synthesis Example 2-3

A polyurethane water dispersion 2C having a nonvolatile content of approximately 30% was produced in the same manner as in Synthesis Example 2-2 except that 6.8 parts by mass of ethylenediamine (number of active hydrogen group: 2) was changed to 15.4 parts by mass of m-xylenediamine (number of active hydrogen group: 2).

Synthesis Example 2-4

A polyurethane water dispersion 2D having a nonvolatile content of approximately 30% was produced in the same manner as in Synthesis Example 2-2 except that 6.8 parts by mass of ethylenediamine (number of active hydrogen group: 2) was changed to 22.4 parts by mass of 4,4'-diaminodiphenylmethane (number of active hydrogen group: 2).

Synthesis Example 2-5

A polyurethane water dispersion 2E having a nonvolatile content of approximately 30% was produced in the same manner as in Synthesis Example 2-2 except that 145.0 parts by mass of Newpol BPE-20NK and 9.5 parts by mass of trimethylolpropane were changed to 140.7 parts by mass of Newpol BPE-20NK and 13.8 parts by mass of 1,4-cyclohexanedimethanol (number of active hydrogen group: 2), and 6.8 parts by mass of ethylenediamine was changed to 9.1 parts by mass of diethylenetriamine (number of active hydrogen group: 3).

Synthesis Example 2-6

A polyurethane water dispersion 2F having a nonvolatile content of approximately 30% was produced in the same manner as in Synthesis Example 2-2 except that 145.0 parts by mass of Newpol BPE-20NK was changed to 60 parts by mass of Nippolan N-4009 (a trade name, a polyester polyol formed of 1,4-butanediol and adipic acid, produced by Nippon Polyurethane Industry Co., Ltd., average hydroxyl group value: 112 mgKOH/g, number of active hydrogen group: 2) and 114 parts by mass of Adekapolyether BPX-11 (a trade name, a propylene oxide adduct of bisphenol A, produced by Adeka Corporation, average hydroxyl group value: 312 mgKOH/g, number of active hydrogen group: 2), the amount of trimethylolpropane (number of active hydrogen group: 3) added was changed to 5.5 parts by mass, the amount of hexamethylene diisocyanate added was changed to 104.2 parts by mass, and the chain extension reaction with ethylenediamine was changed to chain extension reaction with water (number of active hydrogen group: 2).

Synthesis Example 2-7

A polyurethane water dispersion 2G having a nonvolatile content of approximately 30% was produced in the same manner as in Synthesis Example 2-2 except that 145.0 parts by mass of Newpol BPE-20NK was changed to 105.5 parts by mass of Teslac 2477 (a trade name, a polyester polyol formed of 1,6-hexanediol, adipic acid and isophthalic acid, produced by Hitachi Kasei Polymer Co., Ltd., average hydroxyl group value: 64 mgKOH/g, number of active hydrogen group: 2) and 36.9 parts by mass of Adekapolyether BPX-11 (number of active hydrogen group: 2), 129.2 parts by mass of hexamethylene diisocyanate was changed to 131.8 parts by mass of dicyclohexylmethane diisocyanate, and the amount of ethylenediamine (number of active hydrogen group: 3) added was changed to 6.0 parts by mass.

Synthesis Example 2-8

While bubbling nitrogen gas in a reaction vessel equipped with a thermometer, a nitrogen gas introducing tube and a stirrer, 93.6 parts by mass of adipic acid, 106.4 parts by mass of terephthalic acid, 220 parts by mass of neopentyl glycol, and 0.4 part by mass of tetrabutyl titanate were charged therein, and reaction was performed at a reaction temperature controlled to from 160 to 170° C. to make an overhead temperature of from 50 to 60° C. for 8 hours, thereby providing a polyester polyol (a-2) having an acid value of 0.3 mgKOH/g, an average hydroxyl group value of 56 mgKOH/g and a number of active hydrogen group of 2.

In a four-neck flask equipped with a stirrer, a reflux condenser, a thermometer and a nitrogen blowing tube, 187.2 parts by mass of the polyol (a-2), 9.5 parts by mass of trimethylolpropane (number of active hydrogen group: 3), 16.3 parts by mass of dimethylolpropionic acid (number of active hydrogen group: 2), 87 parts by mass of isophorone diisocyanate, and 200 parts by mass of methyl ethyl ketone were placed, and reacted at 75° C. for 4 hours to provide a methyl ethyl ketone solution of a urethane prepolymer having a free isocyanate group content of 1.9% with respect to the nonvolatile component. The solution was cooled to 45° C. and neutralized by adding 12.3 parts by mass of triethylamine, and then the solution was emulsified and dispersed with a homogenizer while gradually adding 900 parts by mass of water thereto, thereby performing chain extending reaction with water (number of active hydrogen group: 2) for 1 hour. The solvent was removed by heating to 50° C. under reduced pressure, thereby providing a polyurethane water dispersion 2H having a nonvolatile content of approximately 30%.

Synthesis Example 2-9

In a four-neck flask equipped with a stirrer, a reflux condenser, a thermometer and a nitrogen blowing tube, 184.2 parts by mass of Eternacoll UH-100 (a polycarbonate polyol formed of 1,6-hexanediol as constitutional component, produced by Ube Industries, Ltd., average hydroxyl group value: 110 mgKOH/g, number of active hydrogen group: 2), 9.5 parts by mass of trimethylolpropane (number of active hydrogen group: 3), 16.3 parts by mass of dimethylolpropionic acid (number of active hydrogen group: 2), 90 parts by mass of diphenylmethane diisocyanate, and 200 parts by mass of methyl ethyl ketone were placed, and reacted at 75° C. for 4 hours to provide a methyl ethyl ketone solution of a urethane prepolymer having a free isocyanate group content of 0.2% or less with respect to the nonvolatile component. The solution was cooled to 45° C. and neutralized by adding 12.3 parts by mass of triethylamine, and then the solution was emulsified and dispersed with a homogenizer while gradually adding 900 parts by mass of water thereto. The solvent was removed by heating to 50° C. under reduced pressure, thereby providing a polyurethane water dispersion 2J having a nonvolatile content of approximately 30%.

Synthesis Example 2-10

A polyurethane water dispersion 2J having a nonvolatile content of approximately 30% was produced in the same manner as in Synthesis Example 2-2 except that 145.0 parts by mass of Newpol BPE-20NK was changed to 129.2 parts by mass of URIC H-62 (a trade name, a castor oil polyol, produced by Itoh Oil Chemicals Co., Ltd., average hydroxyl group value: 260 mgKOH/g, number of active hydrogen group: 2), and 129.2 parts by mass of hexamethylene diisocyanate was changed to 145.0 parts by mass of isophorone diisocyanate.

Synthesis Example 2-11

In a four-neck flask equipped with a stirrer, a reflux condenser, a thermometer and a nitrogen blowing tube, 121.0 parts by mass of Newpol BPE-20NK, 9.5 parts by mass of trimethylolpropane, 14.5 parts by mass of N-methyldiethanolamine, 155.0 parts by mass of isophorone diisocyanate, and 200 parts by mass of methyl ethyl ketone were placed, and reacted at 75° C. for 4 hours to provide a methyl ethyl ketone solution of a urethane prepolymer having a free isocyanate group content of 3.4% with respect to the nonvolatile component. The solution was cooled to 45° C. and quaternarized by adding 15.3 parts by mass of dimethyl sulfate, and then the solution was emulsified and dispersed with a homogenizer while gradually adding 900 parts by mass of water thereto, thereby performing chain extending reaction with water (number of active hydrogen group: 2) for 1 hour. The solvent was removed by heating to 50° C. under reduced pressure, thereby providing a polyurethane water dispersion 2K having a nonvolatile content of approximately 30%.

Synthesis Example 2-12

A polyurethane water dispersion 2L having a nonvolatile content of approximately 30% was produced in the same manner as in Synthesis Example 2-11 except that the chain extending reaction with water (number of active hydrogen group: 2) was changed to chain extending reaction with 6.5 parts by mass of ethylenediamine (number of active hydrogen group: 2).

Synthesis Example 2-13

A polyurethane water dispersion 2M having a nonvolatile content of approximately 30% was produced in the same manner as in Synthesis Example 2-2 except that 145 parts by mass of Newpol BPE-20NK and 9.5 parts by mass of trimethylolpropane were changed to 206.2 parts by mass of Nippolan N-4009 and 5.5 parts by mass of 1,4-cyclohexanedimethanol, the amount of hexamethylene diisocyanate added was changed to 72.0 parts by mass, and the chain extending reaction with ethylenediamine (number of active hydrogen group: 2) was changed to chain extending reaction with water (number of active hydrogen group: 2).

Synthesis Example 2-14

A polyurethane water dispersion 2N having a nonvolatile content of approximately 30% was produced in the same manner as in Synthesis Example 2-13 except that 206.2 parts by mass of Nippolan N-4009 was changed to 181.7 parts by mass thereof, 5.5 parts by mass of 1,4-cyclohexanedimethanol was changed to 9.5 parts by mass of trimethylolpropane, the amount of hexamethylene diisocyanate added was changed to 92.5 parts by mass, and the chain extending reaction with water (number of active hydrogen group: 2) was changed to chain extending reaction with 7.8 parts by mass of diethylenetriamine (number of active hydrogen group: 3).

Synthesis Example 2-15

A polyurethane water dispersion 2O having a nonvolatile content of approximately 30% was produced in the same manner as in Synthesis Example 2-14 except that the amount of Nippolan N-4009 added was changed to 212.9 parts by mass, the amount of trimethylolpropane added was changed to 0.3 part by mass, the amount of hexamethylene diisocyanate added was changed to 70.5 parts by mass, and the chain extending reaction with diethylenetriamine was changed to chain extending reaction with water.

The polyurethane water dispersions thus obtained were measured in the same manners as in Synthesis Example 1-1 and the like. The results are shown in Table 6.

TABLE 6

| Polyurethane water dispersion | Non-volatile content (wt %) | Crosslinking density | Acid value or amine value (mgKOH/g) | Amount of urethane bond (g/eq) | Amount of urea bond (g/eq) |
|---|---|---|---|---|---|
| 2A | 30 | 0.23 | 16 | 481 | 1,684 |
| 2B | 30 | 0.23 | 23 | 232 | 1,282 |
| 2C | 30 | 0.23 | 23 | 232 | 1,282 |
| 2D | 30 | 0.23 | 23 | 232 | 1,282 |
| 2E | 30 | 0.29 | 23 | 241 | 1,083 |
| 2F | 30 | 0.14 | 23 | 269 | 2,807 |
| 2G | 30 | 0.23 | 23 | 381 | 1,438 |
| 2H | 30 | 0.24 | 23 | 459 | 2,425 |
| 2I | 30 | 0.23 | 23 | 417 | 0 |
| 2J | 30 | 0.23 | 23 | 282 | 1,295 |
| 2K | 30 | 0.23 | 23 | 260 | 2,475 |
| 2L | 30 | 0.23 | 23 | 260 | 1,303 |
| 2M | 30 | 0 | 23 | 403 | 5,296 |
| 2N | 30 | 0.92 | 23 | 362 | 1,162 |
| 2O | 30 | 0.007 | 23 | 436 | 3,955 |

Production of Electrodes

Negative electrodes and positive electrodes were produced in the following manner by using the polyurethane water dispersions shown in Table 7 below as a binder.

TABLE 7

| Kind of electrode | Kind of binder |
|---|---|
| negative electrode 2-1 | polyurethane water dispersion 2A |
| negative electrode 2-2 | polyurethane water dispersion 2B |
| negative electrode 2-3 | polyurethane water dispersion 2C |
| negative electrode 2-4 | polyurethane water dispersion 2D |
| negative electrode 2-5 | polyurethane water dispersion 2E |
| negative electrode 2-6 | polyurethane water dispersion 2F |
| negative electrode 2-7 | polyurethane water dispersion 2G |
| negative electrode 2-8 | polyurethane water dispersion 2H |
| negative electrode 2-9 | polyurethane water dispersion 2I |
| negative electrode 2-10 | polyurethane water dispersion 2J |
| negative electrode 2-11 | polyurethane water dispersion 2K |
| negative electrode 2-12 | polyurethane water dispersion 2L |
| negative electrode 2-13 | polyurethane water dispersion 2M |

TABLE 7-continued

| Kind of electrode | Kind of binder |
| --- | --- |
| negative electrode 2-14 | polyurethane water dispersion 2N |
| negative electrode 2-15 | polyurethane water dispersion 2O |
| negative electrode 2-16 | SBR |
| negative electrode 2-17 | polyurethane water dispersion 2G |
| negative electrode 2-18 | SBR |
| negative electrode 2-19 | polyurethane water dispersion 2G |
| negative electrode 2-20 | SBR |
| positive electrode 2-1 | PVDF |
| positive electrode 2-2 | polyurethane water dispersion 2G |
| positive electrode 2-3 | polyurethane water dispersion 2O |
| positive electrode 2-4 | PVDF |
| positive electrode 2-5 | polyurethane water dispersion 2G |
| positive electrode 2-6 | PVDF |
| positive electrode 2-7 | polyurethane water dispersion 2G |

Negative Electrode 2-1

With a planetary mixer, 100 g of natural graphite as a negative electrode active substance, 0.5 g of carbon black (Super-P, produced by Timcal Graphite & Carbon) as a conductive agent, 100 g of a 2% by mass aqueous solution of carboxymethyl cellulose (CMC) (Cellogen WS-C, produced by Dai-ichi Kogyo Seiyaku Co., Ltd.) as a thickener, and 6.7 g of a 30% by mass solution of the polyurethane water dispersion 2A as a binder were mixed to prepare a negative electrode slurry having a solid content of 50%. The negative electrode slurry was coated on an electrolytic copper foil having a thickness of 10 µm with a coating machine, dried at 120° C., and then subjected to a roll pressing treatment, thereby providing a negative electrode 2-1 having a negative electrode active substance in an amount of 7 mg/cm$^2$.

Negative Electrodes 2-2 to 2-10 and 2-13 to 2-16

Negative electrodes were produced in the same manner as in the negative electrode 2-1 except that the polyurethane water dispersion 2A was changed to the polyurethane water dispersions or the SBR latex shown in Table 7.

Negative Electrodes 2-11 and 2-12

With a planetary mixer, 100 g of natural graphite as a negative electrode active substance, 0.5 g of carbon black (Super-P, produced by Timcal Graphite & Carbon) as a conductive agent, 100 g of a 1% by mass aqueous solution of hydroxyethyl cellulose (HEC) (HEC Daicel SP900, produced by Daicel Chemical Industries, Ltd.) as a thickener, and 6.7 g of a 30% by mass solution of the polyurethane water dispersion shown in Table 7 as a binder were mixed to prepare a negative electrode slurry having a solid content of 50%. The negative electrode slurry was coated on an electrolytic copper foil having a thickness of 10 µm with a coating machine, dried at 120° C., and then subjected to a roll pressing treatment, thereby providing a negative electrode having a negative electrode active substance in an amount of 7 mg/cm$^2$.

Negative Electrode 2-17

With a planetary mixer, 100 g of SiO (average particle diameter: 4.5 µm, specific surface area: 5.5 m$^2$/g) as a negative electrode active substance, 5 g of carbon black (Super-P, produced by Timcal Graphite & Carbon) as a conductive agent, 100 g of a 2% by mass aqueous solution of carboxymethyl cellulose (CMC) (Cellogen WS-C, produced by Dai-ichi Kogyo Seiyaku Co., Ltd.) as a thickener, and 6.7 g of a 30% by mass solution of the polyurethane water dispersion 2G as a binder were mixed to prepare a negative electrode slurry having a solid content of 50%. The negative electrode slurry was coated on an electrolytic copper foil having a thickness of 10 µm with a coating machine, dried at 120° C., and then subjected to a roll pressing treatment, thereby providing a negative electrode having a negative electrode active substance in an amount of 2.5 mg/cm$^2$.

Negative Electrode 2-18

A negative electrode was produced in the same manner as in the negative electrode 2-17 except that the polyurethane water dispersion 2G was changed to an SBR latex.

Negative Electrode 2-19

With a planetary mixer, 100 g of Li$_4$Ti$_5$O$_{12}$ as a negative electrode active substance, 5 g of carbon black (Super-P, produced by Timcal Graphite & Carbon) as a conductive agent, 100 g of a 2% by mass aqueous solution of carboxymethyl cellulose (CMC) (Cellogen WS-C, produced by Dai-ichi Kogyo Seiyaku Co., Ltd.) as a thickener, and 6.7 g of a 30% by mass solution of the polyurethane water dispersion 2G as a binder were mixed to prepare a negative electrode slurry having a solid content of 50%. The negative electrode slurry was coated on an electrolytic copper foil having a thickness of 10 µm with a coating machine, dried at 120° C., and then subjected to a roll pressing treatment, thereby providing a negative electrode having a negative electrode active substance in an amount of 9.7 mg/cm$^2$.

Negative Electrode 2-20

A negative electrode was produced in the same manner as in the negative electrode 2-19 except that the polyurethane water dispersion 2G was changed to an SBR latex.

Positive Electrode 2-1

With a planetary mixer, 100 g of LiNi$_{1/3}$Co$_{1/3}$Mn$_{1/3}$O$_2$ as a positive electrode active substance, 7.8 g of carbon black (Super-P, produced by Timcal Graphite & Carbon) as a conductive agent, 6 g of polyvinylidene fluoride as a binder, and 61.3 g of N-methyl-2-pyrrolidone as a dispersion medium were mixed to prepare a positive electrode slurry having a solid content of 65%. The positive electrode slurry was coated on an aluminum foil having a thickness of 20 µm with a coating machine, dried at 130° C., and then subjected to a roll pressing treatment, thereby providing a positive electrode having a positive electrode active substance in an amount of 13.8 mg/cm$^2$.

Positive Electrodes 2-2 and 2-3

With a planetary mixer, 100 g of LiNi$_{1/3}$Co$_{1/3}$Mn$_{1/3}$O$_2$ as a positive electrode active substance, 7.8 g of carbon black (Super-P, produced by Timcal Graphite & Carbon) as a conductive agent, 100 g of a 2% by mass aqueous solution of carboxymethyl cellulose (Cellogen WS-C, produced by Dai-ichi Kogyo Seiyaku Co., Ltd.) as a thickener, and 6.7 g of a 30% by mass solution of the polyurethane water dispersion shown in Table 7 as a binder were mixed to prepare a positive electrode slurry having a solid content of 50%. The positive electrode slurry was coated on an aluminum foil having a thickness of 20 with a coating machine, dried at 130° C., and then subjected to a roll pressing treatment, thereby providing a positive electrode having a positive electrode active substance in an amount of 13.8 mg/cm$^2$.

Positive Electrode 2-4

With a planetary mixer, 100 g of LiMn$_2$O$_4$ as a positive electrode active substance, 5 g of carbon black (Super-P, produced by Timcal Graphite & Carbon) as a conductive agent, 6 g of polyvinylidene fluoride as a binder, and 59.8 g of N-methyl-2-pyrrolidone as a dispersion medium were mixed to prepare a positive electrode slurry having a solid content of 65%. The positive electrode slurry was coated on an aluminum foil having a thickness of 20 µm with a coating machine, dried at 130° C., and then subjected to a roll pressing treatment, thereby providing a positive electrode having a positive electrode active substance in an amount of 22 mg/cm².

Positive Electrode 2-5

With a planetary mixer, 100 g of $LiMn_2O_4$ as a positive electrode active substance, 5 g of carbon black (Super-P, produced by Timcal Graphite & Carbon) as a conductive agent, 100 g of a 2% by mass aqueous solution of carboxymethyl cellulose (Cellogen WS-C, produced by Dai-ichi Kogyo Seiyaku Co., Ltd.) as a thickener, and 6.7 g of a 30% by mass solution of the polyurethane water dispersion 2G as a binder were mixed to prepare a positive electrode slurry having a solid content of 50%. The positive electrode slurry was coated on an aluminum foil having a thickness of 20 μm with a coating machine, dried at 130° C., and then subjected to a roll pressing treatment, thereby providing a positive electrode having a positive electrode active substance in an amount of 22 mg/cm².

Positive Electrode 2-6

With a planetary mixer, 100 g of $LiFeOP_4$ as a positive electrode active substance, 5 g of carbon black (Super-P, produced by Timcal Graphite & Carbon) as a conductive agent, 6 g of polyvinylidene fluoride as a binder, and 135.7 g of N-methyl-2-pyrrolidone as a dispersion medium were mixed to prepare a positive electrode slurry having a solid content of 45%. The positive electrode slurry was coated on an aluminum foil having a thickness of 20 μm with a coating machine, dried at 130° C., and then subjected to a roll pressing treatment, thereby providing a positive electrode having a positive electrode active substance in an amount of 14.5 mg/cm².

Positive Electrode 2-7

With a planetary mixer, 100 g of $LiFeOP_4$ as a positive electrode active substance, 5 g of carbon black (Super-P, produced by Timcal Graphite & Carbon) as a conductive agent, 100 g of a 2% by mass aqueous solution of carboxymethyl cellulose (Cellogen WS-C, produced by Dai-ichi Kogyo Seiyaku Co., Ltd.) as a thickener, and 6.7 g of a 30% by mass solution of the polyurethane water dispersion 2G as a binder were mixed to prepare a positive electrode slurry having a solid content of 50%. The positive electrode slurry was coated on an aluminum foil having a thickness of 20 μm with a coating machine, dried at 130° C., and then subjected to a roll pressing treatment, thereby providing a positive electrode having a positive electrode active substance in an amount of 14.5 mg/cm².

Evaluation of Electrode

The electrodes thus obtained were subjected to the evaluation of the binding capability and the evaluation of the resistance to an electrolytic solution in the same manner as in Example 1-1 and the like. The evaluation results are shown in Table 8.

TABLE 8

| | Kind of electrode | Evaluation of binding capability | Evaluation of resistance to electrolytic solution |
|---|---|---|---|
| Example 2-1 | negative electrode 2-1 | 4 | A |
| Example 2-2 | negative electrode 2-2 | 4 | A |
| Example 2-3 | negative electrode 2-3 | 4 | A |
| Example 2-4 | negative electrode 2-4 | 5 | A |
| Example 2-5 | negative electrode 2-5 | 4 | A |
| Example 2-6 | negative electrode 2-6 | 5 | A |
| Example 2-7 | negative electrode 2-7 | 5 | A |
| Example 2-8 | negative electrode 2-8 | 4 | A |
| Example 2-9 | negative electrode 2-9 | 4 | A |

TABLE 8-continued

| | Kind of electrode | Evaluation of binding capability | Evaluation of resistance to electrolytic solution |
|---|---|---|---|
| Example 2-10 | negative electrode 2-10 | 4 | A |
| Example 2-11 | negative electrode 2-11 | 4 | A |
| Example 2-12 | negative electrode 2-12 | 4 | A |
| Example 2-13 | negative electrode 2-17 | 4 | A |
| Example 2-14 | negative electrode 2-19 | 4 | A |
| Example 2-15 | positive electrode 2-2 | 5 | A |
| Example 2-16 | positive electrode 2-5 | 5 | A |
| Example 2-17 | positive electrode 2-7 | 4 | A |
| Comparative Example 2-1 | negative electrode 2-16 | 3 | A |
| Comparative Example 2-2 | negative electrode 2-18 | 3 | A |
| Comparative Example 2-3 | negative electrode 2-20 | 3 | A |
| Comparative Example 2-4 | positive electrode 2-1 | 3 | A |
| Comparative Example 2-5 | positive electrode 2-4 | 3 | A |
| Comparative Example 2-6 | positive electrode 2-6 | 3 | A |

Production and Evaluation of Lithium Secondary Battery

Lithium batteries were produced in the same manner as in Example 1-1 and the like except that the negative electrodes and the positive electrodes shown in Table 9 were used, and evaluated for battery capability. In the evaluation for battery capability, the cell impedance was measured, and the capacity retention after the charge and discharge cycles was measured, in the same manner as in Examples above. The results are shown in Table 10.

TABLE 9

| | Constitution of electrodes | |
|---|---|---|
| | Negative electrode | Positive electrode |
| Example 2-18 | negative electrode 2-1 | positive electrode 2-1 |
| Example 2-19 | negative electrode 2-2 | positive electrode 2-1 |
| Example 2-20 | negative electrode 2-3 | positive electrode 2-1 |
| Example 2-21 | negative electrode 2-4 | positive electrode 2-1 |
| Example 2-22 | negative electrode 2-5 | positive electrode 2-1 |
| Example 2-23 | negative electrode 2-6 | positive electrode 2-1 |
| Example 2-24 | negative electrode 2-7 | positive electrode 2-1 |
| Example 2-25 | negative electrode 2-8 | positive electrode 2-1 |
| Example 2-26 | negative electrode 2-9 | positive electrode 2-1 |
| Example 2-27 | negative electrode 2-10 | positive electrode 2-1 |
| Example 2-28 | negative electrode 2-11 | positive electrode 2-1 |
| Example 2-29 | negative electrode 2-12 | positive electrode 2-1 |
| Example 2-30 | negative electrode 2-17 | positive electrode 2-1 |
| Example 2-31 | negative electrode 2-19 | positive electrode 2-1 |
| Example 2-32 | negative electrode 2-16 | positive electrode 2-2 |
| Example 2-33 | negative electrode 2-16 | positive electrode 2-5 |
| Example 2-34 | negative electrode 2-16 | positive electrode 2-7 |
| Example 2-35 | negative electrode 2-7 | positive electrode 2-2 |
| Comparative Example 2-7 | negative electrode 2-16 | positive electrode 2-1 |
| Comparative Example 2-8 | negative electrode 2-18 | positive electrode 2-1 |
| Comparative Example 2-9 | negative electrode 2-20 | positive electrode 2-1 |
| Comparative Example 2-10 | negative electrode 2-16 | positive electrode 2-4 |
| Comparative Example 2-11 | negative electrode 2-16 | positive electrode 2-6 |

TABLE 10

| | Evaluation of battery | |
|---|---|---|
| | Cell impedance (mΩ/1 kHz) | Capacity retention after charge and discharge cycles (%) |
| Example 2-18 | 210 | 93.9 |
| Example 2-19 | 204 | 94.1 |
| Example 2-20 | 202 | 94.3 |
| Example 2-21 | 210 | 93.9 |
| Example 2-22 | 202 | 94.4 |
| Example 2-23 | 198 | 94.9 |
| Example 2-24 | 188 | 96.3 |
| Example 2-25 | 198 | 95.0 |
| Example 2-26 | 200 | 94.4 |
| Example 2-27 | 193 | 95.6 |
| Example 2-28 | 201 | 94.3 |
| Example 2-29 | 198 | 95.2 |
| Example 2-30 | 209 | 93.8 |
| Example 2-31 | 190 | 96.2 |
| Example 2-32 | 194 | 95.5 |
| Example 2-33 | 196 | 95.2 |
| Example 2-34 | 186 | 96.2 |
| Example 2-35 | 195 | 95.3 |
| Comparative Example 2-7 | 230 | 91.1 |
| Comparative Example 2-8 | 248 | 87.2 |
| Comparative Example 2-9 | 220 | 92.5 |
| Comparative Example 2-10 | 236 | 89.3 |
| Comparative Example 2-11 | 234 | 89.6 |

Synthesis of Aqueous Resin Composition

Synthesis Example 3-1

In a four-neck flask equipped with a stirrer, a reflux condenser, a thermometer and a nitrogen blowing tube, 145 parts by mass of Newpol BPE-20NK (an ethylene oxide adduct of bisphenol A, produced by Sanyo Chemical Industries, Ltd., average hydroxyl group value: 360 mgKOH/g, number of active hydrogen group: 2), 9.5 parts by mass of trimethylolpropane (number of active hydrogen group: 3), 16.3 parts by mass of dimethylolpropionic acid (number of active hydrogen group: 2), 129.2 parts by mass of hexamethylene diisocyanate, and 200 parts by mass of methyl ethyl ketone were placed, and reacted at 75° C. for 4 hours to provide a methyl ethyl ketone solution of a urethane prepolymer having a free isocyanate group content of 3.5% with respect to the nonvolatile component. The solution was cooled to 45° C. and neutralized by adding 12.3 parts by mass of triethylamine, and then 300 parts by mass of methyl methacrylate was added thereto. Subsequently, the solution was emulsified and dispersed with a homogenizer while adding 1,200 parts by mass of water thereto, and an amine aqueous solution containing 6.8 parts by mass of ethylenediamine (number of active hydrogen group: 2) diluted with 100 parts by mass of water was added thereto for performing chain extending reaction for 1 hour. Subsequently, 1.0 part by mass of t-butyl hydroperoxide and 1.0 part by mass of sodium sulfite were added, and the unsaturated polymerizable monomer was polymerized by performing reaction at 25° C. for 3 hours. The solvent was removed by heating to 50° C. under reduced pressure, thereby providing an aqueous resin composition 3A having a nonvolatile content of approximately 30%. The resulting aqueous resin composition has a mass ratio (X)/(Y) of the polymer of the unsaturated polymerizable monomer (X) and the hydrophilic group-containing polyurethane (Y) of 40/60.

Synthesis Example 3-2

An aqueous resin composition 3B having a nonvolatile content of 30% was produced in the same manner as in Synthesis Example 3-1 except that 145 parts by mass of Newpol BPE-20NK (an ethylene oxide adduct of bisphenol A, produced by Sanyo Chemical Industries, Ltd., average hydroxyl group value: 360 mgKOH/g, number of active hydrogen group: 2) was changed to 140.7 parts by mass thereof, 9.5 parts by mass of trimethylolpropane (number of active hydrogen group: 3) was changed to 13.8 parts by mass of 1,4-cyclohexanedimethanol (number of active hydrogen group: 2), and 6.8 parts by mass of ethylenediamine (number of active hydrogen group: 2) was changed to 9.1 parts by mass of diethylenetriamine.

Synthesis Example 3-3

An aqueous resin composition 3C having a nonvolatile content of 30% was produced in the same manner as in Synthesis Example 3-1 except that 145 parts by mass of Newpol BPE-20NK (an ethylene oxide adduct of bisphenol A, produced by Sanyo Chemical Industries, Ltd., average hydroxyl group value: 360 mgKOH/g, number of active hydrogen group: 2) was changed to 36.9 parts by mass of Adekapolyether BPX-11 (a trade name, a propylene oxide adduct of bisphenol A, produced by Adeka Corporation, average hydroxyl group value: 312 mgKOH/g, number of active hydrogen group: 2) and 105.5 parts by mass of Teslac 2477 (a trade name, a polyester polyol formed of 1,6-hexanediol, adipic acid and isophthalic acid, produced by Hitachi Kasei Polymer Co., Ltd., average hydroxyl group value: 64 mgKOH/g, number of active hydrogen group: 2), 129.2 parts by mass of hexamethylene diisocyanate was changed to 131.8 parts by mass of dicyclohexylmethane diisocyanate, and 6.8 parts by mass of ethylenediamine (number of active hydrogen group: 2) was changed to 6.0 parts by mass thereof.

Synthesis Example 3-4

An aqueous resin composition 3D having a nonvolatile content of 30% was produced in the same manner as in Synthesis Example 3-1 except that 145 parts by mass of Newpol BPE-20NK (an ethylene oxide adduct of bisphenol A, produced by Sanyo Chemical Industries, Ltd., average hydroxyl group value: 360 mgKOH/g, number of active hydrogen group: 2) was changed to 114.0 parts by mass of Adekapolyether BPX-11 (a trade name, a propylene oxide adduct of bisphenol A, produced by Adeka Corporation, average hydroxyl group value: 312 mgKOH/g, number of active hydrogen group: 2) and 60.0 parts by mass of Nippolan N-4009 (a trade name, a polyester polyol formed of 1,4-butanediol and adipic acid, produced by Nippon Polyurethane Industry Co., Ltd., average hydroxyl group value: 112 mgKOH/g, number of active hydrogen group: 2), 9.5 parts by mass of trimethylolpropane (number of active hydrogen group: 3) was changed to 5.5 parts by mass of 1,4-cyclohexanedimethanol (number of active hydrogen group: 2), 129.2 parts by mass of hexamethylene diisocyanate was changed to 104.2 parts by mass thereof, the chain extension was changed to water extension, and 300 parts by mass of methyl methacrylate was changed to 150 parts by mass of methyl methacrylate and 50 parts by mass of styrene.

Synthesis Example 3-5

An aqueous resin composition 3E having a nonvolatile content of 30% was produced in the same manner as in Synthesis Example 3-1 except that 145 parts by mass of Newpol BPE-20NK (an ethylene oxide adduct of bisphenol A, produced by Sanyo Chemical Industries, Ltd., average hydroxyl group value: 360 mgKOH/g, number of active hydrogen group: 2) was changed to 145.2 parts by mass of Nippolan N-4009 (a trade name, a polyester polyol formed of 1,4-butanediol and adipic acid, produced by Nippon Polyurethane Industry Co., Ltd., average hydroxyl group value: 112 mgKOH/g, number of active hydrogen group: 2), 129.2 parts by mass of hexamethylene diisocyanate was changed to 129.0 parts by mass of dicyclohexylmethane diisocyanate, 6.8 parts by mass of ethylenediamine (number of active hydrogen group: 2) was changed to 6.4 parts by mass thereof, and 300 parts by mass of methyl methacrylate was changed to 150 parts by mass of methyl methacrylate and 50 parts by mass of styrene.

Synthesis Example 3-6

An aqueous resin composition 3F having a nonvolatile content of 30% was produced in the same manner as in Synthesis Example 3-5 except that 145.2 parts by mass of Nippolan N-4009 (a trade name, a polyester polyol formed of 1,4-butanediol and adipic acid, produced by Nippon Polyurethane Industry Co., Ltd., average hydroxyl group value: 112 mgKOH/g, number of active hydrogen group: 2) was changed to 145.2 parts by mass of Eternacoll UH-100 (a trade name, a polycarbonate polyol formed of 1,6-hexanediol as constitutional component, produced by Ube Industries, Ltd., average hydroxyl group value: 110 mgKOH/g, number of active hydrogen group: 2), and 50 parts by mass of styrene was changed to 50 parts by mass of butyl methacrylate.

Synthesis Example 3-7

An aqueous resin composition 3G having a nonvolatile content of 30% was produced in the same manner as in Synthesis Example 3-6 except that 50 parts by mass of butyl methacrylate was changed to 50 parts by mass of phenoxyethyl methacrylate (NK Ester PHE-1G, a trade name, produced by Shin-Nakamura Chemical Co., Ltd.).

Synthesis Example 3-8

An aqueous resin composition 3H having a nonvolatile content of 30% was produced in the same manner as in Synthesis Example 3-6 except that 50 parts by mass of butyl methacrylate was changed to 50 parts by mass of styrene.

Synthesis Example 3-9

An aqueous resin composition 3I having a nonvolatile content of 30% was produced in the same manner as in Synthesis Example 3-6 except that 150 parts by mass of methyl methacrylate and 50 parts by mass of butyl methacrylate were changed to 200 parts by mass of methyl methacrylate, 50 parts by mass of styrene, 48 parts by mass of butadiene and 2 parts by mass of 2-methacryloxyethyl phthalate (NK Ester CB-1, a trade name, produced by Shin-Nakamura Chemical Co., Ltd.), and 1,200 parts by mass of water was changed to 1,500 parts by mass thereof. The resulting aqueous resin composition has a mass ratio (X)/(Y) of the polymer of the unsaturated polymerizable monomer (X) and the hydrophilic group-containing polyurethane (Y) of 50/50.

Synthesis Example 3-10

An aqueous resin composition 3J having a nonvolatile content of 30% was produced in the same manner as in Synthesis Example 3-6 except that 150 parts by mass of methyl methacrylate and 50 parts by mass of butyl methacrylate were changed to 150 parts by mass of methyl methacrylate, 150 parts by mass of styrene, 147 parts by mass of butadiene and 3.0 parts by mass of Aqualon KH-05 (a trade name, polyoxyethylene-1-(allyloxymethyl)alkyl ether ammonium sulfate, produced by Dai-ichi Kogyo Seiyaku Co., Ltd.), and 1,200 parts by mass of water was changed to 1,800 parts by mass thereof. The resulting aqueous resin composition has a mass ratio (X)/(Y) of the polymer of the unsaturated polymerizable monomer (X) and the hydrophilic group-containing polyurethane (Y) of 60/40.

Synthesis Example 3-11

An aqueous resin composition 3K having a nonvolatile content of 30% was produced in the same manner as in Synthesis Example 3-6 except that 150 parts by mass of methyl methacrylate and 50 parts by mass of butyl methacrylate were changed to 300 parts by mass of styrene, 147 parts by mass of butadiene and Aqualon BC-05 (a trade name, polyoxyethylene nonyl propenyl phenyl ether ammonium sulfate, produced by Dai-ichi Kogyo Seiyaku Co., Ltd.), and 1,200 parts by mass of water was changed to 1,800 parts by mass thereof. The resulting aqueous resin composition has a mass ratio (X)/(Y) of the polymer of the unsaturated polymerizable monomer (X) and the hydrophilic group-containing polyurethane (Y) of 60/40.

Synthesis Example 3-12

In a four-neck flask equipped with a stirrer, a reflux condenser, a thermometer and a nitrogen blowing tube, 206.2 parts by mass of Nippolan N-4009 (number of active hydrogen group: 2), 5.5 parts by mass of 1,4-cyclohexanedimethanol (number of active hydrogen group: 2), 16.3 parts by mass of dimethylolpropionic acid (number of active hydrogen group: 2), 72 parts by mass of hexamethylene diisocyanate, and 200 parts by mass of methyl ethyl ketone were placed, and reacted at 75° C. for 4 hours to provide a methyl ethyl ketone solution of a urethane prepolymer having a free isocyanate group content of 2.3% with respect to the nonvolatile component. The solution was cooled to 45° C. and neutralized by adding 12.3 parts by mass of triethylamine, and was then emulsified and dispersed with a homogenizer while gradually adding 900 parts by mass of water thereto, thereby performing chain extending reaction with water (number of active hydrogen group: 2) for 1 hour. The solvent was removed by heating to 50° C. under reduced pressure, thereby providing a polyurethane water dispersion 3L having a nonvolatile content of approximately 30%.

Synthesis Example 3-13

In a four-neck flask equipped with a stirrer, a reflux condenser, a thermometer and a nitrogen blowing tube, 181.7 parts by mass of Nippolan N-4009 (number of active hydrogen group: 2), 9.5 parts by mass of trimethylolpropane (number of active hydrogen group: 3), 16.3 parts by mass of dimethylolpropionic acid (number of active hydrogen group: 2), 92.5 parts by mass of hexamethylene diisocyanate, and 200 parts by mass of methyl ethyl ketone were placed, and reacted at 75° C. for 4 hours to provide a methyl ethyl ketone solution of a urethane prepolymer having a free isocyanate group content of 3.8% with respect to the nonvolatile component. The solution was cooled to 45° C. and neutralized by adding 12.3 parts by mass of triethylamine, and was then emulsified and dispersed with a homogenizer while gradually adding 900 parts by mass of water thereto, and an amine aqueous solution containing 7.8 parts by mass of diethylenetriamine (number of active hydrogen group: 3) diluted with 100 parts by mass of water was added thereto, thereby performing chain extending reaction for 1 hour. The solvent was removed by heating to 50° C. under reduced pressure, thereby providing a polyurethane water dispersion 3M having a nonvolatile content of approximately 30%.

Synthesis Example 3-14

In a four-neck flask equipped with a stirrer, a reflux condenser, a thermometer and a nitrogen blowing tube, 212.9 parts by mass of Nippolan N-4009 (number of active hydrogen group: 2), 0.3 part by mass of trimethylolpropane (number of active hydrogen group: 3), 16.3 parts by mass of dimethylolpropionic acid (number of active hydrogen group: 2), 70.5 parts by mass of hexamethylene diisocyanate, and 200 parts by mass of methyl ethyl ketone were placed, and reacted at 75° C. for 4 hours to provide a methyl ethyl ketone solution of a urethane prepolymer having a free isocyanate group content of 2.1% with respect to the nonvolatile component. The solution was cooled to 45° C. and neutralized by adding 12.3 parts by mass of triethylamine, and was then emulsified and dispersed with a homogenizer while gradually adding 900 parts by mass of water thereto, thereby performing chain extending reaction with water (number of active hydrogen group: 2) for 1 hour. The solvent was removed by heating to 50° C. under reduced pressure, thereby providing a polyurethane water dispersion 3N having a nonvolatile content of approximately 30%.

Evaluation of Aqueous Resin Composition

The mass of the nonvolatile content of the aqueous resin composition thus obtained was measured according to JIS K6828. The aqueous resin compositions were subjected to the following measurements. The results are shown in Table 11.

The crosslinking density of the polyurethane contained in the aqueous resin composition was calculated by the expression 1 shown above.

The acid value, the amount of urethane bond, and the amount of urea bond of the polyurethane contained in the aqueous resin composition were calculated from the charged amounts in the synthesis of the urethane resin and the free isocyanate group content with respect to the nonvolatile content after the reaction.

TABLE 11

| Aqueous resin composition | Crosslinking density | Acid value (mgKOH/g) | Amount of urethane bond (g/eq) | Amount of urea bond (g/eq) |
|---|---|---|---|---|
| 3A | 0.23 | 23 | 232 | 1,282 |
| 3B | 0.29 | 23 | 241 | 1,083 |
| 3C | 0.23 | 23 | 381 | 1,298 |
| 3D | 0 | 23 | 266 | 5,333 |
| 3E | 0.23 | 23 | 398 | 1,372 |
| 3F | 0.23 | 23 | 398 | 1,372 |
| 3G | 0.23 | 23 | 398 | 1,372 |
| 3H | 0.23 | 23 | 398 | 1,372 |
| 3I | 0.23 | 23 | 398 | 1,372 |
| 3J | 0.23 | 23 | 398 | 1,372 |
| 3K | 0.23 | 23 | 398 | 1,372 |
| 3L | 0 | 23 | 403 | 5,296 |
| 3M | 0.92 | 23 | 362 | 1,162 |
| 3N | 0.007 | 23 | 436 | 3,955 |

Production of Electrodes

Negative electrodes and positive electrodes were produced in the following manner by using the aqueous resin compositions shown in Table 12 below as a binder.

TABLE 12

| Kind of electrode | Kind of binder |
|---|---|
| negative electrode 3-1 | aqueous resin composition 3A |
| negative electrode 3-2 | aqueous resin composition 3B |
| negative electrode 3-3 | aqueous resin composition 3C |
| negative electrode 3-4 | aqueous resin composition 3D |
| negative electrode 3-5 | aqueous resin composition 3E |
| negative electrode 3-6 | aqueous resin composition 3F |
| negative electrode 3-7 | aqueous resin composition 3G |
| negative electrode 3-8 | aqueous resin composition 3H |
| negative electrode 3-9 | aqueous resin composition 3I |
| negative electrode 3-10 | aqueous resin composition 3J |
| negative electrode 3-11 | aqueous resin composition 3K |
| negative electrode 3-12 | aqueous resin composition 3L |
| negative electrode 3-13 | aqueous resin composition 3M |
| negative electrode 3-14 | aqueous resin composition 3N |
| negative electrode 3-15 | SBR |
| negative electrode 3-16 | aqueous resin composition 3F |
| negative electrode 3-17 | SBR |
| negative electrode 3-18 | aqueous resin composition 3F |
| negative electrode 3-19 | SBR |
| positive electrode 3-1 | PVDF |
| positive electrode 3-2 | aqueous resin composition 3F |
| positive electrode 3-3 | aqueous resin composition 3M |
| positive electrode 3-4 | PVDF |
| positive electrode 3-5 | aqueous resin composition 3I |
| positive electrode 3-6 | PVDF |
| positive electrode 3-7 | aqueous resin composition 3G |

Negative Electrode 3-1

With a planetary mixer, 100 g of natural graphite as a negative electrode active substance, 0.5 g of carbon black (Super-P, produced by Timcal Graphite & Carbon) as a conductive agent, 100 g of a 2% by mass aqueous solution of carboxymethyl cellulose (CMC) (Cellogen WS-C, produced by Dai-ichi Kogyo Seiyaku Co., Ltd.) as a thickener, and 6.7 g of a 30% by mass solution of the aqueous resin composition 3A as a binder were mixed to prepare a negative electrode slurry having a solid content of 50%. The negative electrode slurry was coated on an electrolytic copper foil having a thickness of 10 μm with a coating machine, dried at 120° C., and then subjected to a roll pressing treatment, thereby providing a negative electrode 3-1 having a negative electrode active substance in an amount of 7 mg/cm².

Negative Electrodes 3-2 to 3-15

Negative electrodes were produced in the same manner as in the negative electrode 3-1 except that the aqueous resin composition 3A was changed to the aqueous resin compositions or the SBR latex shown in Table 12.

Negative Electrode 3-16

With a planetary mixer, 100 g of SiO (average particle diameter: 4.5 μm, specific surface area: 5.5 m²/g) as a negative electrode active substance, 5 g of carbon black (Super-P, produced by Timcal Graphite & Carbon) as a conductive agent, 100 g of a 2% by mass aqueous solution of carboxymethyl cellulose (CMC) (Cellogen WS-C, produced by Dai-ichi Kogyo Seiyaku Co., Ltd.) as a thickener, and 6.7 g of a 30% by mass solution of the aqueous resin composition 3F as a binder were mixed to prepare a negative electrode slurry having a solid content of 50%. The negative electrode slurry was coated on an electrolytic copper foil having a thickness of 10 μm with a coating machine, dried at 120° C., and then subjected to a roll pressing treatment, thereby providing a negative electrode having a negative electrode active substance in an amount of 2.5 mg/cm².

Negative Electrode 3-17

A negative electrode was produced in the same manner as in the negative electrode 3-16 except that the aqueous resin composition was changed to an SBR latex.

Negative Electrode 3-18

With a planetary mixer, 100 g of $Li_4Ti_5O_{12}$ as a negative electrode active substance, 5 g of carbon black (Super-P, produced by Timcal Graphite & Carbon) as a conductive agent, 100 g of a 2% by mass aqueous solution of carboxymethyl cellulose (CMC) (Cellogen WS-C, produced by Dai-ichi Kogyo Seiyaku Co., Ltd.) as a thickener, and 6.7 g of a 30% by mass solution of the aqueous resin composition 3F as a binder were mixed to prepare a negative electrode slurry having a solid content of 50%. The negative electrode slurry was coated on an electrolytic copper foil having a thickness of 10 μm with a coating machine, dried at 120° C., and then subjected to a roll pressing treatment, thereby providing a negative electrode having a negative electrode active substance in an amount of 9.7 mg/cm².

Negative Electrode 3-19

A negative electrode was produced in the same manner as in the negative electrode 3-18 except that the aqueous resin composition was changed to an SBR latex.

Positive Electrode 3-1

With a planetary mixer, 100 g of $LiNi_{1/3}Co_{1/3}Mn_{1/3}O_2$ as a positive electrode active substance, 7.8 g of carbon black (Super-P, produced by Timcal Graphite & Carbon) as a conductive agent, 6 g of polyvinylidene fluoride as a binder, and 61.3 g of N-methyl-2-pyrrolidone (NMP) as a dispersion medium were mixed to prepare a positive electrode slurry having a solid content of 65%. The positive electrode slurry was coated on an aluminum foil having a thickness of 20 μm with a coating machine, dried at 130° C., and then subjected to a roll pressing treatment, thereby providing a positive electrode having a positive electrode active substance in an amount of 13.8 mg/cm².

Positive Electrodes 3-2 and 3-3

With a planetary mixer, 100 g of $LiNi_{1/3}Co_{1/3}Mn_{1/3}O_2$ as a positive electrode active substance, 7.8 g of carbon black (Super-P, produced by Timcal Graphite & Carbon) as a conductive agent, 100 g of a 2% by mass aqueous solution of carboxymethyl cellulose (CMC) (Cellogen WS-C, produced by Dai-ichi Kogyo Seiyaku Co., Ltd.) as a thickener, and 6.7 g of a 30% by mass solution of the aqueous resin composition shown in Table 12 as a binder were mixed to prepare a positive electrode slurry having a solid content of 50%. The positive electrode slurry was coated on an aluminum foil having a thickness of 20 μm with a coating machine, dried at 130° C., and then subjected to a roll pressing treatment, thereby providing a positive electrode having a positive electrode active substance in an amount of 13.8 mg/cm².

Positive Electrode 3-4

With a planetary mixer, 100 g of $LiMn_2O_4$ as a positive electrode active substance, 5 g of carbon black (Super-P, produced by Timcal Graphite & Carbon) as a conductive agent, 6 g of polyvinylidene fluoride as a binder, and 59.8 g of N-methyl-2-pyrrolidone (NMP) as a dispersion medium were mixed to prepare a positive electrode slurry having a solid content of 65%. The positive electrode slurry was coated on an aluminum foil having a thickness of 20 μm with a coating machine, dried at 130° C., and then subjected to a roll pressing treatment, thereby providing a positive electrode having a positive electrode active substance in an amount of 22 mg/cm².

Positive Electrode 3-5

With a planetary mixer, 100 g of $LiMn_2O_4$ as a positive electrode active substance, 5 g of carbon black (Super-P, produced by Timcal Graphite & Carbon) as a conductive agent, 100 g of a 2% by mass aqueous solution of carboxymethyl cellulose (CMC) (Cellogen WS-C, produced by Dai-ichi Kogyo Seiyaku Co., Ltd.) as a thickener, and 6.7 g of a 30% by mass solution of the aqueous resin composition 3I shown in Table 12 as a binder were mixed to prepare a positive electrode slurry having a solid content of 50%. The positive electrode slurry was coated on an aluminum foil having a thickness of 20 μm with a coating machine, dried at 130° C., and then subjected to a roll pressing treatment, thereby providing a positive electrode having a positive electrode active substance in an amount of 22 mg/cm².

Positive Electrode 3-6

With a planetary mixer, 100 g of $LiFeOP_4$ as a positive electrode active substance, 5 g of carbon black (Super-P, produced by Timcal Graphite & Carbon) as a conductive agent, 6 g of polyvinylidene fluoride as a binder, and 135.7 g of N-methyl-2-pyrrolidone (NMP) as a dispersion medium were mixed to prepare a positive electrode slurry having a solid content of 45%. The positive electrode slurry was coated on an aluminum foil having a thickness of 20 μm with a coating machine, dried at 130° C., and then subjected to a roll pressing treatment, thereby providing a positive electrode having a positive electrode active substance in an amount of 14.5 mg/cm².

Positive Electrode 3-7

With a planetary mixer, 100 g of $LiFeOP_4$ as a positive electrode active substance, 5 g of carbon black (Super-P, produced by Timcal Graphite & Carbon) as a conductive agent, 100 g of a 2% by mass aqueous solution of carboxymethyl cellulose (CMC) (Cellogen WS-C, produced by Dai-ichi Kogyo Seiyaku Co., Ltd.) as a thickener, and 6.7 g of a 30% by mass solution of the aqueous resin composition 3G shown in Table 12 as a binder were mixed to prepare a positive electrode slurry having a solid content of 50%. The positive electrode slurry was coated on an aluminum foil having a thickness of 20 μm with a coating machine, dried at 130° C., and then subjected to a roll pressing treatment, thereby providing a positive electrode having a positive electrode active substance in an amount of 14.5 mg/cm².

Evaluation of Electrode

The electrodes thus obtained were subjected to the evaluation of the binding capability and the evaluation of the resistance to an electrolytic solution in the same manner as above. The evaluation results are shown in Table 13.

TABLE 13

| | Kind of electrode | Evaluation of binding capability | Evaluation of resistance to electrolytic solution |
|---|---|---|---|
| Example 3-1 | negative electrode 3-1 | 4 | A |
| Example 3-2 | negative electrode 3-2 | 4 | A |
| Example 3-3 | negative electrode 3-3 | 4 | A |
| Example 3-4 | negative electrode 3-4 | 4 | A |
| Example 3-5 | negative electrode 3-5 | 4 | A |
| Example 3-6 | negative electrode 3-6 | 4 | A |
| Example 3-7 | negative electrode 3-7 | 5 | A |
| Example 3-8 | negative electrode 3-8 | 4 | A |
| Example 3-9 | negative electrode 3-9 | 5 | A |
| Example 3-10 | negative electrode 3-10 | 4 | A |
| Example 3-11 | negative electrode 3-11 | 4 | A |
| Example 3-12 | negative electrode 3-16 | 4 | A |
| Example 3-13 | negative electrode 3-18 | 4 | A |
| Example 3-14 | positive electrode 3-2 | 5 | A |

TABLE 13-continued

| | Kind of electrode | Evaluation of binding capability | Evaluation of resistance to electrolytic solution |
|---|---|---|---|
| Example 3-15 | positive electrode 3-5 | 4 | A |
| Example 3-16 | positive electrode 3-7 | 4 | A |
| Comparative Example 3-1 | negative electrode 3-15 | 3 | A |
| Comparative Example 3-2 | negative electrode 3-17 | 3 | B |
| Comparative Example 3-3 | negative electrode 3-19 | 3 | A |
| Comparative Example 3-4 | positive electrode 3-1 | 3 | A |
| Comparative Example 3-5 | positive electrode 3-4 | 3 | A |
| Comparative Example 3-6 | positive electrode 3-6 | 3 | A |

Production and Evaluation of Lithium Secondary Battery

Lithium batteries were produced in the same manner as in Example 1-1 and the like except that the negative electrodes and the positive electrodes shown in Table 14 were used, and evaluated for battery capability. In the evaluation for battery capability, the cell impedance was measured, and the capacity retention after the charge and discharge cycles was measured, in the same manner as in Examples above. The results are shown in Table 15.

TABLE 14

| | Constitution of electrodes | |
|---|---|---|
| | Negative electrode | Positive electrode |
| Example 3-17 | negative electrode 3-1 | positive electrode 3-1 |
| Example 3-18 | negative electrode 3-2 | positive electrode 3-1 |
| Example 3-19 | negative electrode 3-3 | positive electrode 3-1 |
| Example 3-20 | negative electrode 3-4 | positive electrode 3-1 |
| Example 3-21 | negative electrode 3-5 | positive electrode 3-1 |
| Example 3-22 | negative electrode 3-6 | positive electrode 3-1 |
| Example 3-23 | negative electrode 3-7 | positive electrode 3-1 |
| Example 3-24 | negative electrode 3-8 | positive electrode 3-1 |
| Example 3-25 | negative electrode 3-9 | positive electrode 3-1 |
| Example 3-26 | negative electrode 3-10 | positive electrode 3-1 |
| Example 3-27 | negative electrode 3-11 | positive electrode 3-1 |
| Example 3-28 | negative electrode 3-16 | positive electrode 3-1 |
| Example 3-29 | negative electrode 3-18 | positive electrode 3-1 |
| Example 3-30 | negative electrode 3-15 | positive electrode 3-2 |
| Example 3-31 | negative electrode 3-15 | positive electrode 3-5 |
| Example 3-32 | negative electrode 3-15 | positive electrode 3-7 |
| Example 3-33 | negative electrode 3-6 | positive electrode 3-2 |
| Comparative Example 3-7 | negative electrode 3-15 | positive electrode 3-1 |
| Comparative Example 3-8 | negative electrode 3-17 | positive electrode 3-1 |
| Comparative Example 3-9 | negative electrode 3-19 | positive electrode 3-1 |
| Comparative Example 3-10 | negative electrode 3-15 | positive electrode 3-4 |
| Comparative Example 3-11 | negative electrode 3-15 | positive electrode 3-6 |

TABLE 15

| | Evaluation of battery | |
|---|---|---|
| | Cell impedance (mΩ/1 kHz) | Capacity retention after charge and discharge cycles (%) |
| Example 3-17 | 218 | 93.8 |
| Example 3-18 | 215 | 94.2 |
| Example 3-19 | 196 | 95.0 |
| Example 3-20 | 221 | 93.1 |
| Example 3-21 | 208 | 94.8 |
| Example 3-22 | 188 | 96.5 |
| Example 3-23 | 198 | 95.8 |
| Example 3-24 | 189 | 96.7 |
| Example 3-25 | 192 | 95.8 |
| Example 3-26 | 186 | 96.8 |
| Example 3-27 | 191 | 96.4 |
| Example 3-28 | 212 | 93.1 |
| Example 3-29 | 192 | 96.7 |
| Example 3-30 | 195 | 95.2 |
| Example 3-31 | 202 | 94.7 |
| Example 3-32 | 193 | 96.1 |
| Example 3-33 | 197 | 95.2 |
| Comparative Example 3-7 | 230 | 91.3 |
| Comparative Example 3-8 | 248 | 87.2 |
| Comparative Example 3-9 | 220 | 92.5 |
| Comparative Example 3-10 | 236 | 89.3 |
| Comparative Example 3-11 | 234 | 89.6 |

It is understood from the results shown in Table 15 that as compared to the use of an SBR latex or polyvinylidene fluoride having been used, the use of the aqueous resin composition of the invention provides more excellent binding capability, a lower cell impedance, and a higher capacity retention after the charge and discharge cycles.

INDUSTRIAL APPLICABILITY

The binder of the invention may be utilized as a binder for an electrode of a lithium secondary battery, and an electrode produced therewith may be used for production of various lithium secondary batteries. The resulting lithium secondary batteries may be applied to various portable equipments, such as a portable telephone, a notebook computer, a personal digital assistant (PDA), a camcorder and a digital still camera, and may also be used as middle-size or large-size lithium secondary batteries for use in an electric power-assisted bicycle, an electrically powered automobile and the like.

The invention claimed is:

1. A binder for an electrode of a lithium secondary battery, comprising a hydrophilic group-containing polyurethane that has a crosslinking density of from 0.01 to 0.50 per 1000 atomic weight of the polyurethane and comprises (A) a polyisocyanate, (B) a compound that has three or more active hydrogen groups, (C) a compound that has one or more active hydrogen groups and one or more hydrophilic groups, and (D) a chain extending agent,
    wherein (B) the compound that has three or more active hydrogen groups contains both of (a) one or more kinds of polyols selected from the group consisting of a polycarbonate polyol, a polyester polyol having an aromatic ring, and a polyether polyol having an aromatic ring, and (b) a compound that has three or more active hydrogen groups and is not said one or more kind of polyol selected from said group.

2. The binder for an electrode of a lithium secondary battery according to claim 1, which comprises a water dispersion of the hydrophilic group-containing polyurethane.

3. The binder for an electrode of a lithium secondary battery according to claim 1, wherein a content of (B) the compound that has two or more active hydrogen groups is 30% by mass or more and 75% by mass or less with respect to the polyurethane in the polyurethane water dispersion.

4. The binder for an electrode of a lithium secondary battery according to claim 1, wherein the one or more kinds of polyols selected from the group consisting of a polycarbonate polyol, a polyester polyol having an aromatic ring, and a polyether polyol having an aromatic ring have a number average molecular weight of 300 or more and 3,000 or less.

5. The binder for an electrode of a lithium secondary battery according to claim 1, wherein the polyurethane water dispersion has an average particle diameter of 0.005 μm or more and 0.5 μm or less.

6. The binder for an electrode of a lithium secondary battery according to claim 1, wherein (C) the compound that has one or more active hydrogen groups and one or more hydrophilic groups contains a polyol compound having a carboxyl group.

7. The binder for an electrode of a lithium secondary battery according to claim 1, wherein the polyurethane water dispersion has an acid value of 5 mgKOH/g or more and 50 mgKOH/g or less with respect to the total solid content of the polyurethane.

8. The binder for an electrode of a lithium secondary battery according to claim 1, wherein (A) the polyisocyanate contains an alicyclic isocyanate and/or an aromatic isocyanate.

9. The binder for an electrode of a lithium secondary battery according to claim 1, wherein (D) the chain extending agent contains a trifunctional or higher functional polyamine.

10. The binder for an electrode of a lithium secondary battery according to claim 1, wherein (C) the compound that has one or more active hydrogen groups and one or more hydrophilic groups contains a polyol compound containing a carboxyl group.

11. The binder for an electrode of a lithium secondary battery according to claim 1, further comprising a polymer of an unsaturated polymerizable monomer that is emulsified with the hydrophilic group-containing polyurethane.

12. The binder for an electrode of a lithium secondary battery according to claim 11, wherein the hydrophilic group-containing polyurethane has a crosslinking density of 0.01 or more and 0.50 or less per 1,000 atomic weight of the polyurethane.

13. The binder for an electrode of a lithium secondary battery according to claim 11, wherein (B) the compound that has two or more active hydrogen groups contains one or more kinds of polyols selected from the group consisting of a polycarbonate polyol, a polyester polyol having an aromatic ring, and a polyether polyol having an aromatic ring.

14. A lithium secondary battery comprising an electrode including the binder for an electrode of a lithium secondary battery according to claim 1.

\* \* \* \* \*